(12) United States Patent
Kobayashi et al.

(10) Patent No.: US 8,908,860 B2
(45) Date of Patent: Dec. 9, 2014

(54) INFORMATION PROCESSING DEVICE, SYSTEM, AND METHOD, INCLUDING HASH VALUE REPLACEMENT PROCESSING AND SIGNATURE VERIFICATION PROCESSING AS PART OF ENCRYPTED CONTENT PLAYBACK PROPRIETY DETERMINATION PROCESSING

(75) Inventors: Yoshiyuki Kobayashi, Tokyo (JP); Takamichi Hayashi, Tokyo (JP); Hiroshi Kuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 37 days.

(21) Appl. No.: 13/562,788

(22) Filed: Jul. 31, 2012

(65) Prior Publication Data

US 2013/0058477 A1  Mar. 7, 2013

(30) Foreign Application Priority Data

Sep. 5, 2011  (JP) ................. 2011-192498

(51) Int. Cl.
| | |
|---|---|
| H04K 1/00 | (2006.01) |
| H04L 9/00 | (2006.01) |
| H04L 9/28 | (2006.01) |
| G06F 21/10 | (2013.01) |
| H04L 9/32 | (2006.01) |
| G06F 21/72 | (2013.01) |
| G11B 20/00 | (2006.01) |

(52) U.S. Cl.
CPC .......... *G11B 20/00086* (2013.01); *G06F 21/10* (2013.01); *H04L 2209/603* (2013.01); *H04L 9/3247* (2013.01); *G06F 21/72* (2013.01); *G06F 2221/2107* (2013.01); *H04L 9/3239* (2013.01); *H04L 2463/103* (2013.01)
USPC .......................................................... 380/28

(58) Field of Classification Search
USPC .................... 380/28; 726/26–33; 706/57–59; 713/187, 176–179, 189–193; 386/252–253, 255, 257–260; 705/57–59
See application file for complete search history.

(56) References Cited

U.S. PATENT DOCUMENTS

| | | | |
|---|---|---|---|
| 7,082,413 B2 * | 7/2006 | Bell et al. ........................ 705/51 |
| 7,325,145 B1 * | 1/2008 | England ....................... 713/187 |
| 7,874,015 B2 * | 1/2011 | Aaron ............................. 726/30 |

(Continued)

OTHER PUBLICATIONS

U.S. Appl. No. 13/673,042, filed Nov. 9, 2012, Kobayashi, et al.

(Continued)

*Primary Examiner* — Dede Zecher
*Assistant Examiner* — Vadim Savenkov
(74) *Attorney, Agent, or Firm* — Oblon, Spivak, McClelland, Maier & Neustadt, L.L.P.

(57) ABSTRACT

An information processing device includes a data processing unit executing decryption and playing processing of an encrypted content, with the data processing unit executing content playback propriety determination processing by applying an encrypted content signature file set in response to a content to be played; with the encrypted content signature file including a content hash list group including a hash value, and signature data for data generated from a content encryption key and the content hash list group; and with the data processing unit executing, with the content playback propriety determination processing, hash value matching processing between a hash value calculated from a content to be played, and a hash value for matching included in the content hash list group, and signature data verification processing to which the signature has been applied to perform decryption and playing processing of the encrypted content with success of both processes as a condition.

18 Claims, 24 Drawing Sheets

(56) References Cited

U.S. PATENT DOCUMENTS

| | | | |
|---|---|---|---|
| 2003/0084298 A1* | 5/2003 | Messerges et al. | 713/176 |
| 2005/0050332 A1* | 3/2005 | Serret-Avila et al. | 713/187 |
| 2005/0204398 A1* | 9/2005 | Ryal | 725/112 |
| 2006/0047967 A1* | 3/2006 | Akhan et al. | 713/176 |
| 2008/0134340 A1* | 6/2008 | Ueda et al. | 726/26 |
| 2008/0256326 A1* | 10/2008 | Patterson et al. | 711/206 |
| 2010/0088517 A1* | 4/2010 | Piersol | 713/171 |
| 2010/0205461 A1* | 8/2010 | Satou et al. | 713/193 |
| 2011/0237326 A1* | 9/2011 | Murakami | 713/187 |

OTHER PUBLICATIONS

U.S. Appl. No. 13/463,017, filed May 3, 2012, Kuno, et al.
U.S. Appl. No. 13/558,687, filed Jul. 26, 2012, Kuno, et al.
U.S. Appl. No. 13/556,301, filed Jul. 24, 2012, Kobayashi, et al.

* cited by examiner

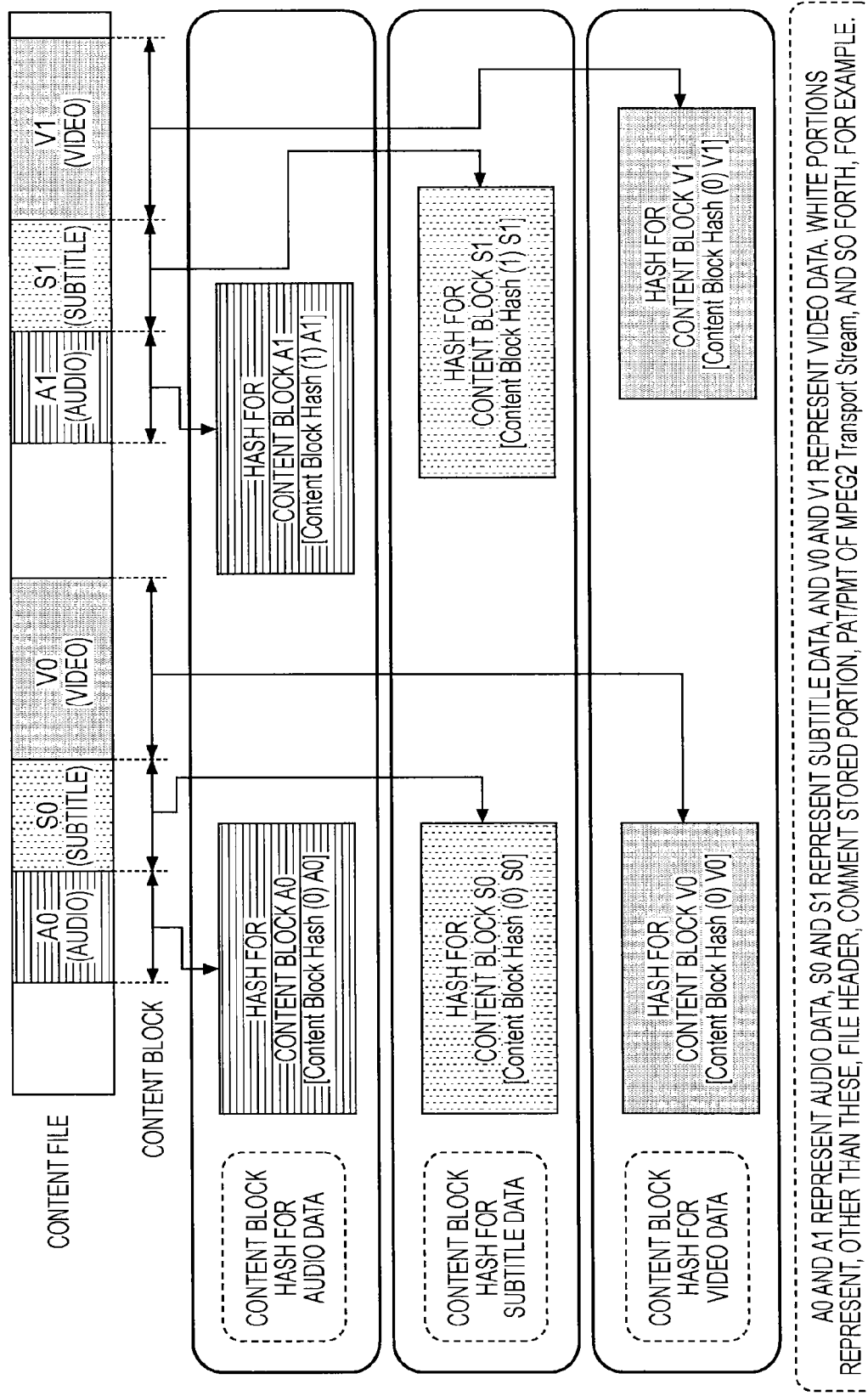

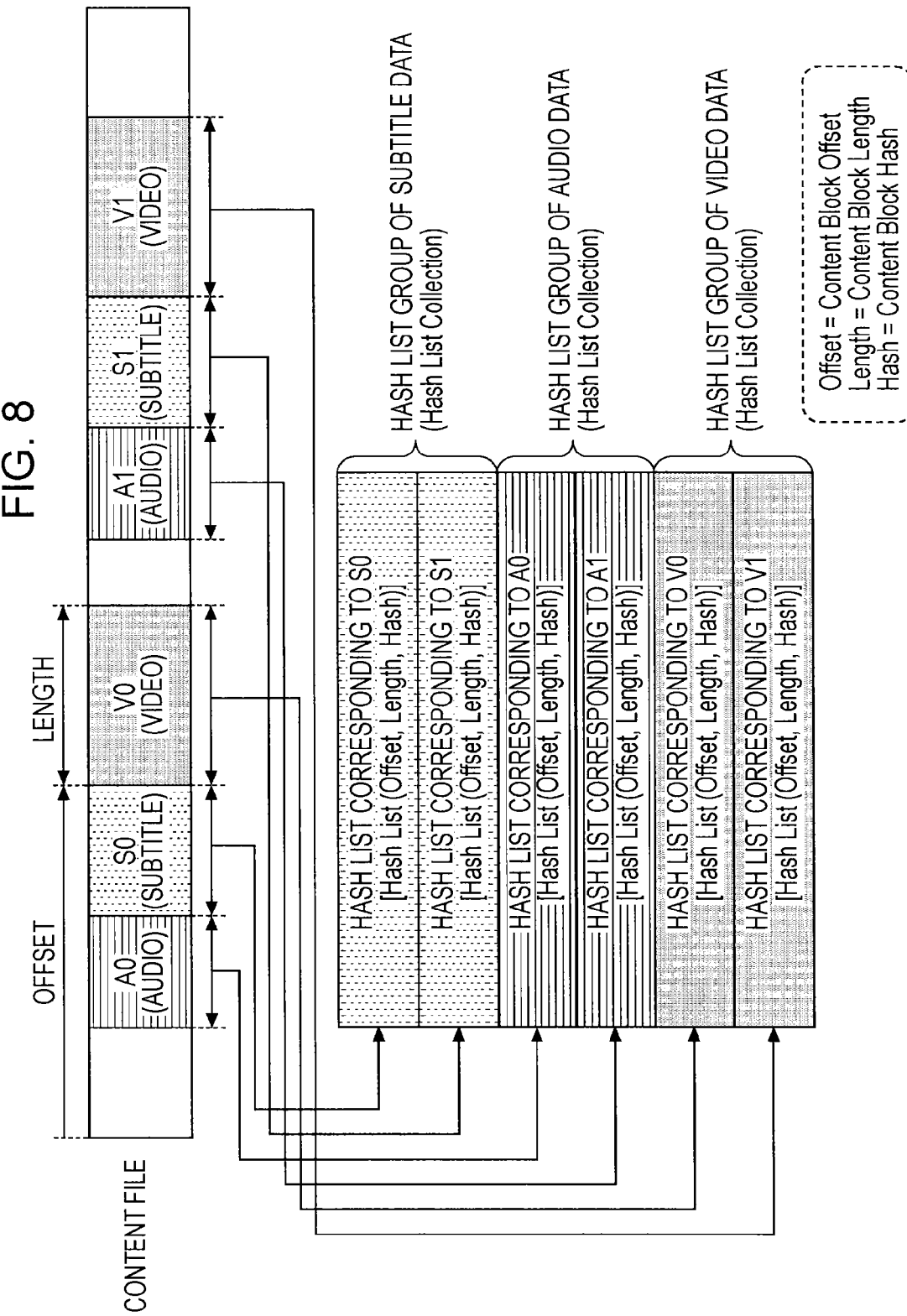

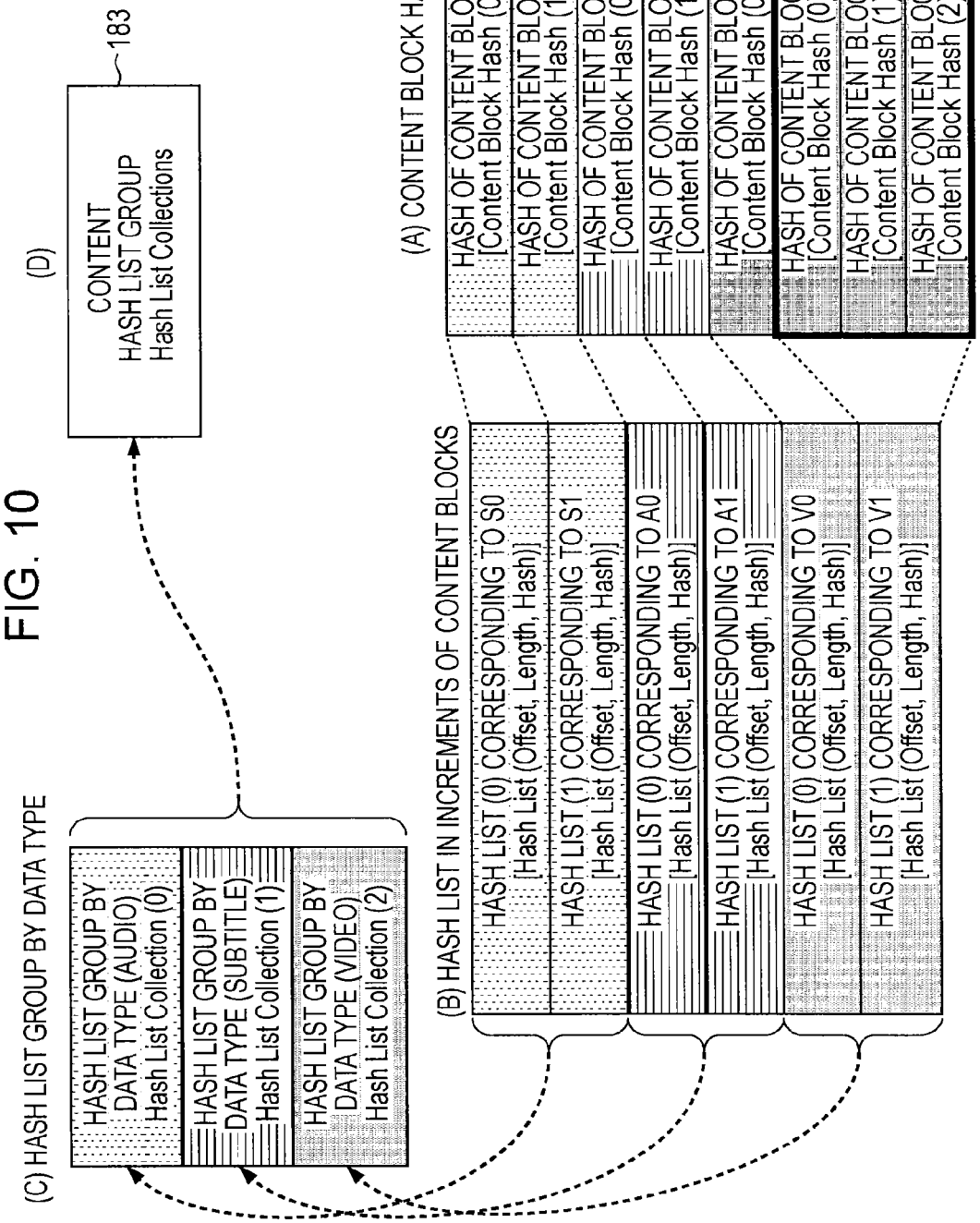

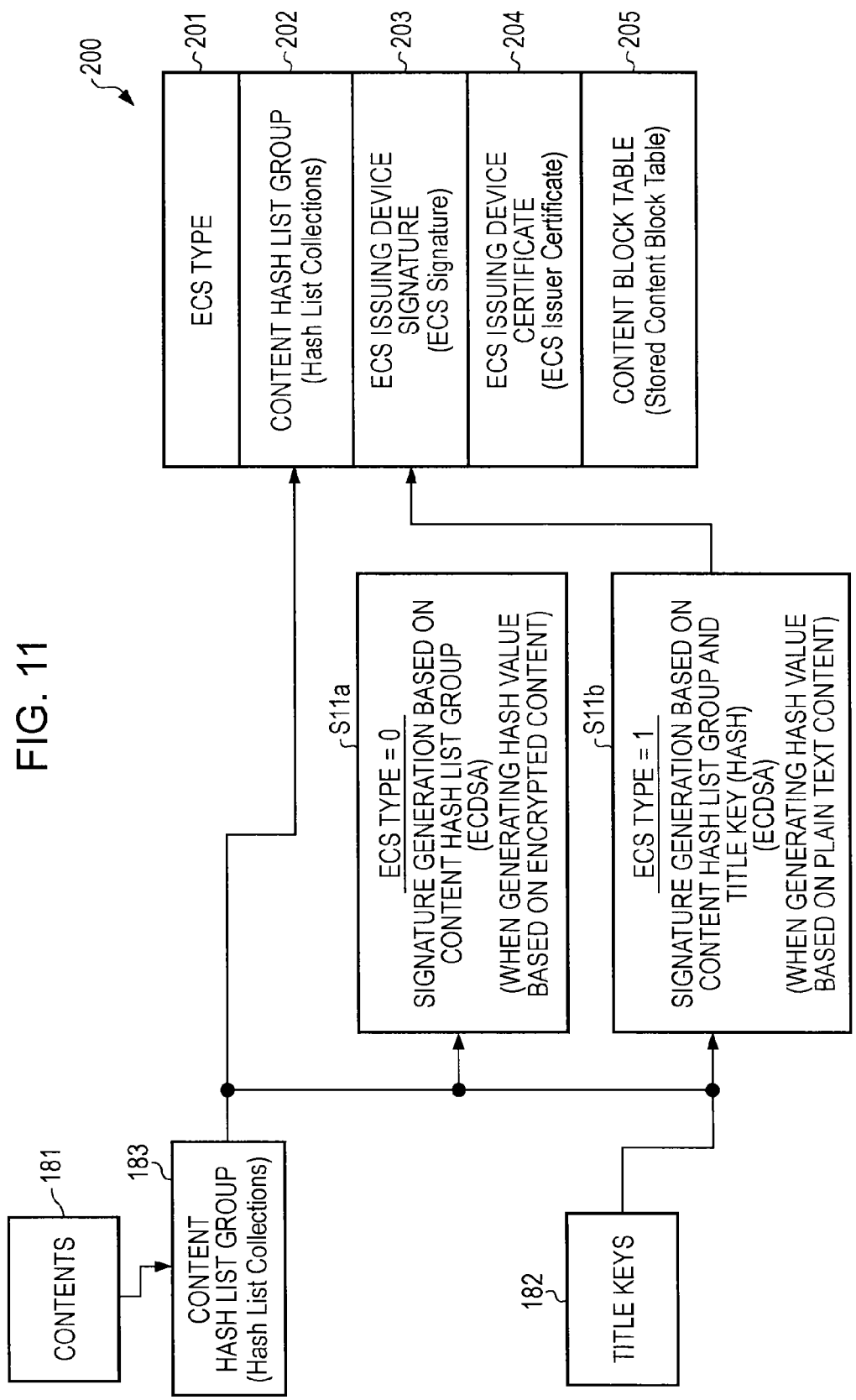

FIG. 19

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 00h | Hash List Collection Tag | | | | | | | | | | | | Number of Hash Lists | | | |
| 10h | Hash List (0) | | | | | | | | | | | | | | | |
| .. | | | | | | | | | | | | | | | | |
| .. | : | | | | | | | | | | | | | | | |
| .. | | | | | | | | | | | | | | | | |
| .. | Hash List (Number of Hash Lists − 1) | | | | | | | | | | | | | | | |
| .. | | | | | | | | | | | | | | | | |
| nnh | | | | | | | | | | | | | | | | |

FIG. 20

(1) HASH LIST IN THE CASE OF CONTENT WITHOUT VARIATION

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 00h | Hash Type | Content Block Offset | | | | | Content Block Length | | | Number of Content Block Hashes (= 1) | Reserved 1 | | | | | |
| 10h | Content Block Hash (0) | | | | | | | | | | | | | | | |
| | Reserved 2 | | | | | | | | | | | | | | | |

(2) HASH LIST IN THE CASE OF CONTENT WITH VARIATIONS

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 00h | Hash Type | Content Block Offset | | | | | Content Block Length | | | Number of Content Block Hashes (= k) | Reserved 1 | | | | | |
| 10h | Content Block Hash (0) | | | | | | | | | | | | | | | |
| | Content Block Hash (1) | | | | | | | | | | | | | | | |
| .. | .. | | | | | | | | | | | | | | | |
| nnh | Content Block Hash (k-1) | | | | | | | | | | | | | | | |
| | Reserved 2 | | | | | | | | | | | | | | | |

FIG. 21

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 00h | Number of Stored Content Block Index | | | Reserved | | | | | | | | | | | | |
| 10h | Stored Content Block Index (0) | | | | | | | | | | | | | | | |
| .. | .. | | | | | | | | | | | | | | | |
| nnh | Stored Content Block Index (Number of Stored Content Block Index - 1) | | | | | | | | | | | | | | | |

INFORMATION PROCESSING DEVICE, SYSTEM, AND METHOD, INCLUDING HASH VALUE REPLACEMENT PROCESSING AND SIGNATURE VERIFICATION PROCESSING AS PART OF ENCRYPTED CONTENT PLAYBACK PROPRIETY DETERMINATION PROCESSING

BACKGROUND

The present disclosure relates to an information processing device, an information processing system, and an information processing method, and a program, and specifically relates to an information processing device, an information processing system, and an information processing method, and a program which prevent unauthorized usage of contents.

For example, contents such as movies, music, and so forth are provided to a user via various media such as DVD (Digital Versatile Disc), Blu-ray Disc (registered trademark), or flash memory, or a network such as the Internet or the like, or broadcast waves, or the like. The user can perform playing of contents using various information processing devices, for example, such as a PC, portable terminal, a recording/playing device such as a BD player or the like, a television set, and so forth.

However, with regard to many contents such as music data, video data, and so forth to be provided to a user, copyright, distribution right, and so forth are possessed by a creator or seller thereof. Accordingly, in the case of providing a content to a user, a content provider frequently performs predetermined content usage restrictions.

Using a digital recording device and a recording medium, for example, enables recording and playing to repeated without deteriorating video and audio, and accordingly, a problem has occurred in that usage of unauthorized copied contents is widespread, such as distribution of unauthorized copied contents via the Internet, circulation of so-called pirated discs, and so forth.

In order to prevent such unauthorized coping of data, various techniques for preventing illegal coping to a digital recording device and a recording medium have come into practical use.

For example, content encryption processing is one form thereof. A key used for decrypting encrypted data is provided to only a playing device which has received a license serving as a right to use a content. The license is provided to a playing device designed to follow a predetermined operational regulation, for example, such as performing no unauthorized copying, or the like. On the other hand, a playing device which has not received a license does not have a key for decrypting encrypted data, and accordingly does not perform decryption of encrypted data.

However, there is at the present a situation wherein, even when such encryption of a content is executed, unauthorized content use is still performed.

A specific example of unauthorized use of a content will be described. We will assume an arrangement wherein a content server distributes en encrypted content to a user device, e.g., a user device such as a recording/playing device, PC, portable terminal, or the like.

In the case that the content server distributes an encrypted content to a user device, the content server distributes the following data to the user device via a network, for example.
(a) Encrypted content
(b) Encryption key used for encryption and decryption of an encrypted content For example, in the event of providing the same content such as the same movie or the like to a great number of user devices, there are the following two processing modes as processing modes that the content server executes.
(A) To generate a different encrypted content by applying an individual different encryption key to provide to each of the user devices
(B) To generate the same encrypted content encrypted by the same encryption key to provide to multiple user devices In the case of considering safety for preventing unauthorized usage of a content, the processing in the above (A) is effective.

However, in order to perform the processing in the above (A), processing has to be performed for generating an individual encrypted content by setting an individual encryption key to each of the great number of users, causing a problem in that the processing load of the server increases according to the number of users to which the content is to be distributed, such as generation and management of encryption keys, generation processing of encrypted contents, and so forth.

Accordingly, in many cases, the processing in the above (B), i.e., with regard to the same content, it is not unusual to generate the same encrypted content encrypted by the same encryption key, and to provide to multiple users.

For example, one encryption key (=title key) is set to a content having a certain title, and the same encrypted content is generated by applying this one title key, and the following data sets are distributed to multiple users.
(a) Encrypted content
(b) Title key The processing load of the content server is reduced by performing such processing.

Note that, hereinafter, an encryption key to be set in increments of content titles will be described as "title key". Note that a title key is applied to encryption and decryption processing of the encrypted content of the title thereof.

However, in the event of distributing the same dataset to a great number of users in this way, i.e., in the event of distributing a combination of the same data of the
(a) Encrypted content, and
(b) Title key,
the following fraudulent processing may be performed by a part of "unauthorized users".
(1) "Unauthorized user" reads out a title key received from the server to expose the read title key to an unspecified number of users, or
(2) "Unauthorized user" uses a title key A corresponding to a certain encrypted content A to encrypt a completely different content B,
and the following combined data is distributed to an unspecified number of users.
(X) Title key A
(Y) Encrypted content B encrypted by Title key A For example, in the event of the processing in the above (1) having been performed, a content encrypted by using the title key thereof is illegally used by a great number of users who have obtained an unauthorized exposed title key.

Also, in the event of the processing in the above (2) having been performed, an unauthorized dataset that the above "unauthorized user" has generated, i.e.,
(X) Title key A, and
(Y) Encrypted content B encrypted by Title key A,
these are obtained from "unauthorized user", and accordingly, the encrypted content B is illegally used by a great number of users.

Consequently, the number of users who legally purchase the original authorized dataset, i.e., the encrypted content B, and the title key B corresponding to the encrypted content B, these datasets decrease, and the profits of a copywriter and a distribution rights holder are markedly diminished.

Further, a specific unauthorized process will be described. Let us say that the content server holds datasets in the following (1) through (3) encrypted content (C) and title key (Kt).

(1) (Kt11, C11)
(2) (Kt12, C12)
(3) (Kt13, C13)

where Cnn is a content file, and Ktnn is a title key used for encryption of a content.

(Kt11, C11) is a dataset of a title key (Kt11), and a content (C11) encrypted by the title key (Kt11).

For example, let us say that a certain "unauthorized user Ux" has purchased all of the following three datasets.

(1) (Kt11, C11)
(2) (Kt12, C12)
(3) (Kt13, C13)

Let us say that this purchase processing itself has been performed in accordance with a predetermined purchase procedure between a user device which "unauthorized user Ux" possesses, e.g., a PC and the content server.

"Unauthorized user Ux" records the above (1) through (3) datasets in a medium such as a hard disk or the like of the PC which is the user device.

"Unauthorized user Ux" reads out the above (1) through (3) datasets from a medium such as a hard disk or the like of the user device PC such as a PC or the like, and temporarily decrypts all of the encrypted contents using the corresponding title key to obtain the following data.

Title keys: Kt11, Kt12, Kt13
Decrypted contents: C11, C12, C13

Note that, with an authorized playing device, in the event of using an authorized content playing program, a title key is not externally read out, but the title key itself may be read out by a method such as installing an unauthorized program into a device such as a PC or the like, and it is difficult to completely prevent readout of the title key, which is the current situation.

Further, "unauthorized user Ux" generates data of the decoded contents: C11 through C13 being connected, i.e., C11||C12||C13, and encrypts this concatenated data using the title key Kt11.

Specifically, "unauthorized user Ux" generates (Kt11, C11||C12||C13),
and illegally circulates this dataset via a network, e.g., sells this at a cheap price, or provides this to a great number of users without charge, for example.

Upon such processing being performed, a great number of general users may obtain the above unauthorized dataset, i.e., (Kt11, C11||C12||C13), from the above "unauthorized user Ux".

This dataset is made up of the following datasets,
(a) Encrypted content encrypted by title key Kt11, and
(b) Title key Kt11, and has the same data configuration as with the data content provided from an authorized content provider to a user.

Therefore, an authorized playing device having an authorized content playing program having a license can decode and play the encrypted content [C11||C12||C13] using the title key Kt11 without any problem.

As a result, unauthorized usage is spread without authorized content purchase being performed, and users who legally purchase such as C11 through C13 and so forth decrease, and accordingly, the profits of an authorized rights holder are diminished.

Further, description will be made in a specific manner. For example, let us say that, with regard to a certain drama or the like, with series contents made up of 12 titles of a first episode though a twelfth episode, content purchase increments are set in increments of each episode as follows.

First episode=(Kt01, C01)
Second episode=(Kt02, C02)
Third episode=(Kt03, C03)
and so on through
Twelfth episode=(Kt12, C12)

In such a case, a certain "unauthorized user" performs processing for purchasing all of the series of 12 titles of the first through twelfth episodes, connecting the contents C01 through C12 of the first through twelfth episodes, generating a dataset re-encrypted bi the title key Kt01 corresponding to the first episode, i.e., (Kt01, C01||C02||C03 ... ||C12), and exposing this over a network, or illegally selling this.

In such a case, with a great number of user devices, the unauthorized dataset that "unauthorized user" has generated, i.e., (Kt01, C01||C02||C03 ... ||C12), may be obtained for playback and use.

For example, let us say that the regular price of each of the above twelve episodes is 2000 yen.

In this case, when purchasing all of the twelve episodes, the prices is calculated as 12×2000 yen=24000 yen.

For example, the above "unauthorized user" purchases the above unauthorized dataset, i.e., (Kt01, C01||C02||C03 ... ||C12), at 6000 yen. In this case, a great number of users purchase this cheap content, and consequently, authorized content sale is inhibited, and the profits and rights of the original copyright holder and selling rights holder are infringed.

In addition to the above example, the title key Kt11 set in response to one certain content C11 is used for encryption of other irrelevant various contents Cxx, and accordingly, the (Kt11, Cxx) content may be taken as various contents, which causes a problem in that all of the contents may be decrypted and played with one title key.

That is to say, even with a playing device wherein playback of a plain text content is forbidden, the same decryption and playback as with an authorized purchase content may be performed by use of the above unauthorized dataset.

Further, the "unauthorized user" can even perform replacement and re-encryption of a title key as a service, acting as if he/she were an authorized server.

In this way, it is difficult to prevent unauthorized use of a content just by countermeasures such as content encryption processing.

There is a technique causing a playing device to execute content tampering verification as a content unauthorized use exclusion technique different from encryption processing. According to this technique being applied, for example, with an unauthorized content circulation process, in the event that some sort of modification (tampering) has been made on a content, use of the tampered content thereof can be stopped.

Specifically, a user device which executes content playback has a control arrangement wherein processing for verifying whether or not there is content tampering is executed, and only in the case that confirmation is made that there is no content tampering, content playback is permitted, and in the case that confirmation is made that there is tampering, content playback is not executed.

For example, with Japanese Unexamined Patent Application Publication No. 2002-358011, a control arrangement has been disclosed wherein a hash value is calculated from a content file to be scheduled for playback, comparison with a hash value for matching prepared beforehand, i.e., a hash value for matching calculated beforehand based on authorized content data is executed, and in the case that the newly calculated hash value agrees with the hash value for matching, determination is made that there is no content tampering to proceed to content playing processing.

However, in the case of executing processing for calculating a hash value based on a content in this way, when the capacity of content data serving as the original data for hash value calculation is great, the processing load and processing time for calculation is also increased. Nowadays, quality improvement in moving image data has advanced, and there are many cases where one content has the data quantity of several gigabytes to several dozen gigabytes. A user device which executes content playback is caused to execute content hash value calculation processing based on such large capacity data, which leads to a problem in that data processing capabilities demanded of the user device become excessively great, and further leads to a problem in that time used for content verification is prolonged, and content playing processing is not performed in an effective manner.

Also, with Japanese Patent No. 4576936, an arrangement has been disclosed wherein a hash value regarding each hash unit set as segmented data of a content stored in an information recording medium is recorded in a content hash value table, and is stored in the information recording medium along with the content.

According to this disclosed arrangement, an information processing device which executes content playback executes hash value matching processing based on one or more hash units randomly selected. According to the present arrangement, regardless of the data amount of a content, hash value calculation and matching processing based on a hash unit having little data amount may be performed, and effective content verification at a user device which executes content playback may be performed.

However, the arrangement according to Japanese Patent No. 4576936 is premised on processing as to a content stored in the information recording medium. Though this disclosed arrangement may be available in the case that a hash value can be recorded along with a content at the time of manufacturing the information recording medium for example, this has a problem in that it is difficult to apply this disclosed arrangement to a content downloaded from a server for example.

Also, both of the above Japanese Unexamined Patent Application Publication No. 2002-358011 and Japanese Patent No. 4576936 emphasize on content tampering verification, and have a problem in that circulation of an authorized copied content having no tampering is completely uncontrollable.

In this way, it is the present situation that content encryption and tampering verification processing serving as existing techniques do not have sufficient prevention effects on circulation of unauthorized copied contents, and leaking of content encryption keys.

SUMMARY

It has been found to be desirable to provide an information processing device, an information processing system, an information processing method, and a program which realize effective prevention of unauthorized use of contents.

According to an embodiment of the present disclosure, an information processing device includes: a data processing unit configured to execute decryption and playing processing of an encrypted content, with the data processing unit executing content playback propriety determination processing by applying an encrypted content signature file set in response to a content to be played; with the encrypted content signature file including a content hash list group including a hash value based on the configuration data of a content, and signature data as to data generated from a content encryption key and the content hash list group; and with the data processing unit executing, with the content playback propriety determination processing, hash value matching processing between a hash value calculated from the configuration data of a content to be played, and a hash value for matching included in the content hash list group, and signature verification processing to which the signature data has been applied to perform decryption and playing processing of the encrypted content under the condition that both of the hash value matching processing and the signature verification processing have been successful.

A hash value stored in the content hash list group may be a hash value generated based on the configuration data of a plain text content not subjected to encryption.

A hash value stored in the content hash list group may be a hash value in increments of content blocks by data type making up a content.

A hash value stored in the content hash list group may be a hash value in increments of content blocks by each data of audio, video, and subtitle making up a content.

Each of content hash lists making up the content hash list group may be data including a hash value in increments of content blocks by each data of audio, video, and subtitle making up a content, and attribute information indicating position information of the content block.

A content hash list making up the content hash list group may be data including a plurality of hash values corresponding to a plurality of content blocks corresponding to a plurality of different variations of data.

A plurality of different variations of data may be a plurality of video data taken from a plurality of different angles in a multi-angle content.

The data processing unit may execute, with the content playback propriety determination processing, hash value replacement processing for replacing a hash value for matching included in the content hash list group with a hash value calculated from the configuration data of a content to be played, and the signature verification processing by applying concatenated data of a content hash list group subjected to the hash value replacement processing, and the hash value of a content encryption key.

According to an embodiment of the present disclosure, an information processing system includes: a user device configured to execute content playing processing; a content providing device configured to execute content providing processing as to the user device; and an encrypted content signature issuing device configured to execute encrypted content signature file providing processing as to the content providing device; with the content providing device transmitting to the encrypted content signature issuing device a content hash list group including a hash value based on the configuration data of a content, and a content encryption key or the hash value of an encryption key; with the encrypted content signature issuing device generating signature data with the content hash list group and the hash value of a content encryption key as a signature object, and generating an encrypted content signature file including the generated signature data, and the content hash list group to transmit to the content providing device; with the content providing device providing an encrypted content and the encrypted content signature file to a user device; and with the user device executing hash value matching processing between a hash value calculated from the configuration data of a content to be played, a hash value for matching included in a content hash list group within an encrypted content signature file, and signature verification processing to which signature data within the encrypted content signature file has been applied, and performing decryption and playing processing of the encrypted content under the condition that both of the hash value matching processing and the signature verification processing have been successful.

According to an embodiment of the present disclosure, an information processing device includes: a data processing unit configured to generate the configuration data of an encrypted content signature file to be applied to content playback propriety determination processing, with the data processing unit calculating a hash value in increments of content blocks by data type making up a content, generating a hash list including the calculated hash value, and attribute information including the position information of a content block serving as a hash value calculation object, generating a content hash list group collected from a plurality of the hash lists, transmits the generated content hash list group, and a content encryption key or the hash value of this encryption key to an external signature issuing device, obtaining from the signature issuing device an encrypted content signature file including the content hash list group, and signature data as to generated data based on a content encryption key and the content hash list group, and providing the obtained encrypted content signature file and encrypted content to a user device.

A hash value stored in the content hash list group may be a hash value generated based on the configuration data of a plain text content not subjected to encryption.

A hash value stored in the content hash list group may be a hash value in increments of content blocks by data type making up a content.

A hash value stored in the content hash list group may be a hash value in increments of content blocks by each data of audio, video, and subtitle making up a content.

Each content hash list making up the content hash list group may be data including a hash value in increments of content blocks by each data of audio, video, and subtitle making up a content, and attribute information indicating the position information of the content block.

A content hash list making up the content hash list group may be data including a plurality of hash values corresponding to a plurality of content blocks corresponding to a plurality of different variations of data.

According to an embodiment of the present disclosure, an information processing method is arranged to be executed at an information processing device configured to execute decryption and playing processing of an encrypted content, causing a data processing unit of the information processing device to execute content playback propriety determination processing to which an encrypted content signature file set in response to a content to be played has been applied, with the encrypted content signature file including a content hash list group including a hash value based on the configuration data of a content, and signature data as to data generated from a content encryption key and the content hash list group; and with the data processing unit executing, with the content playback propriety determination processing, hash value matching processing between a hash value calculated from the configuration data of a content to be played, and a hash value for matching included in the content hash list group, and signature verification processing to which the signature data has been applied, and performing decryption and playing processing of the encrypted content under the condition that both of the hash value matching processing and the signature verification processing have been successful.

According to an embodiment of the present disclosure, an information processing method is arranged to be executed at an information processing device configured to execute content providing processing as to a user device, with the information processing device including a data processing unit configured to generate the configuration data of an encrypted content signature file to be applied to content playback propriety determination processing at the user device; and with the data processing unit calculating a hash value in increments of content blocks by data type making up a content, generating a hash list including the calculated hash value, and attribute information including the position information of a content block serving as a hash value calculation object, generating a content hash list group collected from a plurality of the hash lists, transmitting the generated content hash list group, and a content encryption key or the hash value of this encryption key to an external signature issuing device, obtaining from the signature issuing device an encrypted content signature file including the content hash list group, and signature data as to generated data based on a content encryption key and the content hash list group, and providing the obtained encrypted content signature file and encrypted content to the user device.

According to an embodiment of the present disclosure, a program causes an information processing device configured to execute decryption and playing processing of an encrypted content to execute information processing, causing a data processing unit of the information processing device to execute content playback propriety determination processing to which an encrypted content signature file set in response to a content to be played has been applied, with the encrypted content signature file including a content hash list group including a hash value based on the configuration data of a content, and signature data as to data generated from a content encryption key and the content hash list group; and with the program causing, with the content playback propriety determination processing, the data processing unit to execute hash value matching processing between a hash value calculated from the configuration data of a content to be played, and a hash value for matching included in the content hash list group, and signature verification processing to which the signature data has been applied, and to perform decryption and playing processing of the encrypted content under the condition that both of the hash value matching processing and the signature verification processing have been successful.

According to an embodiment of the present disclosure, a program causes an information processing device configured to execute content providing processing as to a user device to execute information processing, with the information processing device including a data processing unit configured to generate the configuration data of an encrypted content signature file to be applied to content playback propriety determination processing at the user device; and with the program causing the data processing unit to execute: processing arranged to calculate a hash value in increments of content blocks by data type making up a content; processing arranged to generate a hash list having attribute information including the calculated hash value and the position information of a content block serving as a hash value calculation object; processing arranged to generate a content hash list group where a plurality of the hash lists are collected; processing arranged to transmit the generated content hash list group, and a content encryption key or the hash value of this encrypted key to an external signature issuing device; processing arranged to obtain from the signature issuing device an encrypted content signature file including the content hash list group, and signature data as to generated data based on a content encryption key and the content hash list group; and processing arranged to provide the obtained encrypted content signature file and encrypted content to the user device.

Note that the program according to the present disclosure is, for example, a program that can be provided to an information processing device or computer system which can execute various program codes using a storage medium or communication medium to be provided in a computer-readable format. According to such a program being provided in a computer-readable format, and accordingly, processing according to the program is realized on the information processing device or computer system.

Further objects, features, and advantages of the present disclosure will become apparent from later-described embodiments of the present disclosure and the attached drawings which will be described in further detail. Note that system as used in the present Specification is a logical group configuration of multiple devices, and is not restricted to each component device being within the same housing.

According to an embodiment of the present disclosure, a device and a method for effectively preventing unauthorized use of contents are realized.

Specifically, an encrypted content signature file to be applied to content playback propriety determination processing is set. The encrypted content signature file includes a content hash list group including a hash value based on a content block by data type such as audio, video, and so forth, and signature data as to data generated from a content encryption key and a content hash list group. A user device executes hash value matching processing between a hash value calculated from the configuration data of a content to be played, and a hash value for matching included in a content hash list group, and signature verification processing to which signature data has been applied, and performs decryption and playing processing of encoded contents under the condition that both of the hash value matching processing and signature verification processing have been successful.

With an arrangement of the present disclosure, for example, (1) Content, and (2) Encryption key (title key) to be applied to encryption and decryption processing of the content, signature verification generated based on these data is executed, and according to this verification processing, only in the case that confirmation is made that the content and title key, a combination of these two data is a correct combination, playing and use of the content is allowed at the user device.

Accordingly, in the case of combined data between an unauthorized content and title key different from a combination of the original content and title key, signature verification is not achieved, and such unauthorized content use is prevented.

BRIEF DESCRIPTION OF THE DRAWINGS

FIG. 7 is a diagram for describing the detailed configuration of a content hash list group (Hash List Collections);

FIG. 8 is a diagram for describing the detailed configuration of the content hash list group (Hash List Collections);

FIG. 10 is a diagram for describing the detailed configuration of the content hash list group (Hash List Collections);

FIG. 11 is a diagram for describing the overview of the generation processing and data configuration of an encrypted content signature file (ECS file);

FIG. 19 is a diagram for describing the details of the format of the encrypted content signature file (ECS file);

FIG. 20 is a diagram for describing the details of the format of the encrypted content signature file (ECS file);

FIG. 21 is a diagram for describing the details of the format of the encrypted content signature file (ECS file);

DETAILED DESCRIPTION OF EMBODIMENTS

Hereinafter, the details of an information processing device, an information processing system, an information processing method, and a program according to the present disclosure will be described with reference to the drawings. Note that description will be made in accordance with the following items.

1. Entire Configuration Example of Information Processing System
2. Overview of Generation Processing and Data Configuration of Encrypted Content Signature File (ECS File)
3. Generation of Content Signature File (ECS File), Providing of Contents, and Use Processing Sequence
4. Generation Processing of Encrypted Content Signature File (ECS File), and Detailed Configuration of ECS File
5. Generation Processing Example of Signature Data
6. Content Playing processing at User Device
7. Details of Format of Encrypted Content Signature File (ECS File)

Figure 1:
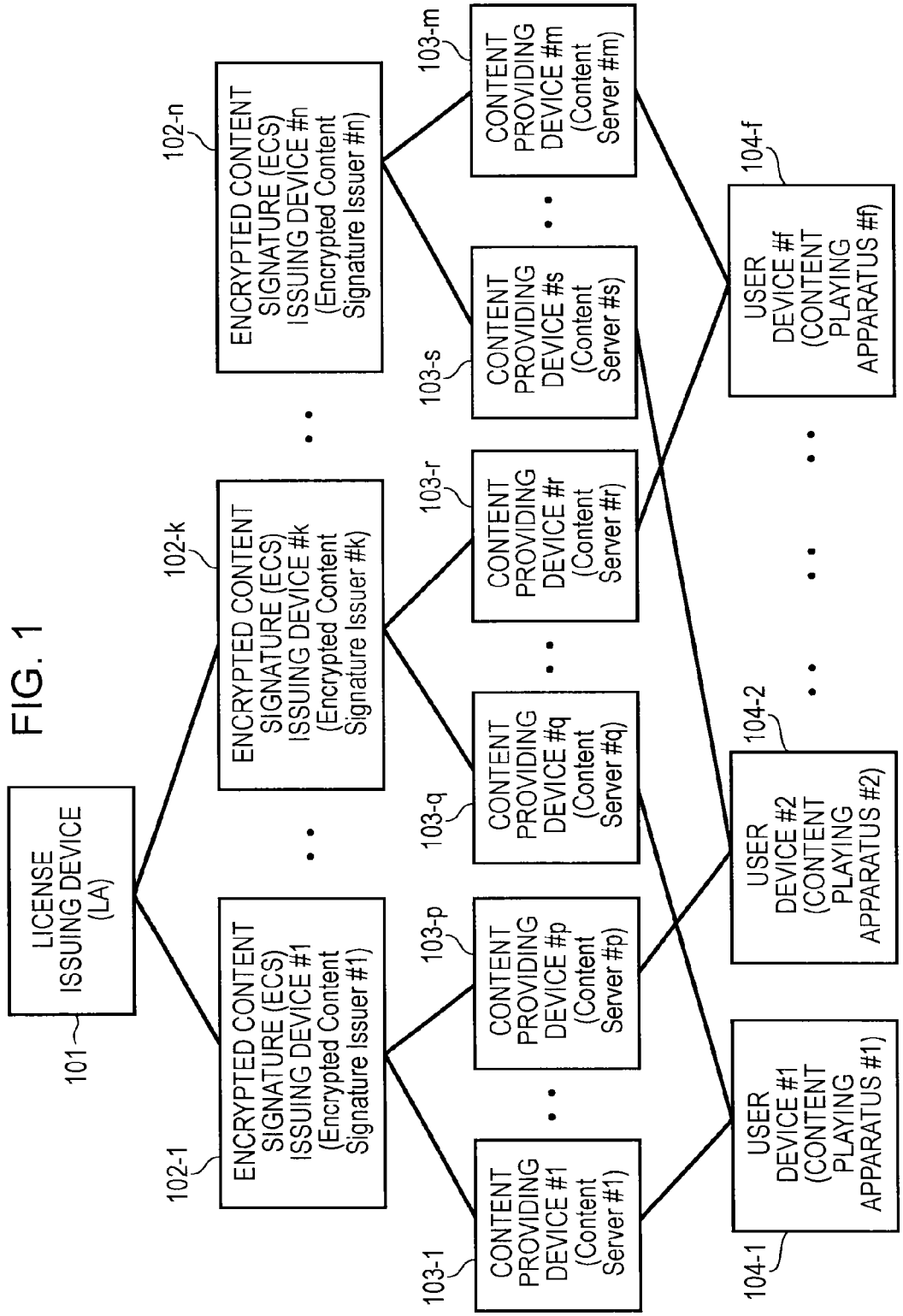
FIG. 1 is a diagram for describing the entire configuration of an information processing system according to the present disclosure for preventing unauthorized use of contents.

7-1. Entire Configuration of Encrypted Content Signature File (ECS File)
7-2. Details of ECS Issuing Device Certificate (ECS Issuer Certificate)
7-3. Details of Content Hash List Group (Hash List Collections)
7-4. Details of Content Block Table (Stored Content Block Table)
8. Hardware Configuration Example of Each Device
9. Arrangements of Present Disclosure
1. Entire Configuration Example of Information Processing System First, description will be made regarding the entire configuration of an information processing system according to the present disclosure for preventing unauthorized use of contents, with reference to FIG. 1. FIG. 1 illustrates the entire configuration example of the information processing system. The following four types of devices are illustrated in FIG. 1 as a hierarchical configuration.

(A) License Issuing Device (LA) 101
(B) Encrypted Content Signature (ECS) Issuing Devices (Encrypted Content Signature Issuers) 102-1 through **102-*n***
(C) Content Providing Devices (Content Servers) 103-1 through **103-*m***
(D) User Devices (Content Playing Devices) 104-1 through **104-*f***

(C) Content Providing Devices (Content Servers) 103-1 through **103-*m*** include various information processing devices such as content servers, broadcasting stations, further devices for transmitting contents such as a media providing company for providing media such as discs in which a content is stored, devices for executing content recording as to media, and so forth. There are a great number of these.

(D) User Devices (Content Playing Devices) 104-1 through **104-*f* are devices for receiving or reading out a movie, music, or other various contents from (C) Content Providing Devices (Content Servers) 103-1 through 103-*m*** via the Internet or broadcast waves, or a medium such as a disc or the like to execute playing processing, and specifically include various types of content-playable information processing devices such as a PC, a portable terminal, a DVD player, a BD player, a television and so forth.

(B) Encrypted Content Signature (ECS) Issuing Devices (Encrypted Content Signature Issuers) 102-1 through **102-*n* generate an encrypted content signature file (ECS file) corresponding to a content that (C) Content Providing Devices (Content Servers) 103-1 through 103-*m*** provide.

(C) Content Providing Devices (Content Servers) 103-1 through **103-*m* perform, in the case of providing a content such as a new movie content or the like to the user devices 104 for example, a generation request for an encrypted content signature file (ECS file) corresponding to the content thereof to an encrypted content signature (ECS) issuing device (Encrypted Content Signature Issuer) 102**.

(B) Encrypted Content Signature (ECS) Issuing Devices (Encrypted Content Signature Issuers) 102-1 through **102-*n* generates, in response to this request, an encrypted content signature file (ECS file) to provide this to (C) Content Providing Devices (Content Servers) 103**.

Note that specific configuration and generation processing of this encrypted content signature file (ECS file) will be described in detail at a subsequent stage.

(C) Content Providing Devices (Content Servers) 103 receive the encrypted content signature file (ECS file) from (B) Encrypted Content Signature (ECS) Issuing Devices (Encrypted Content Signature Issuers) 102, and provide this to (D) User Devices (Content Playing Devices) 104 along with the encrypted content.

(D) User Devices (Content Playing Devices) 104 perform signature verification processing of the encrypted content signature file (ECS file) before playing the content, and only in the case that authentication of this signature verification processing has been confirmed, decryption and playback of the content is permitted.

Note that a playing processing program in accordance with a sequence for executing decryption and playback of a content with signature verification of the encrypted content signature file (ECS file) as a condition is stored in the user devices (content playing devices) 104, signature verification of the encrypted content signature file (ECS file), and content playback are executed in accordance with this playing processing program.

In the case that signature verification of the encrypted content signature file (ECS file) has not been successful, playback of the content is forbidden.

(A) License Issuing Device (LA) 101 provides a license serving as an issuance permit for the ECS file to (B) Encrypted Content Signature (ECS) Issuing Devices (Encrypted Content Signature Issuers) 102-1 through **102-*n***.

(A) License Issuing Device (LA) 101 confirms propriety for (B) Encrypted Content Signature (ECS) Issuing Devices (Encrypted Content Signature Issuers) 102-1 through **102-*n*** in accordance with a predetermined license issuance sequence, and in the case that propriety has been confirmed, issues a license to the corresponding encrypted content signature (ECS) issuing device.

Note that the license is specifically a public key certificate to which a signature according to the secret key of the license issuing device (LA) 101 is added, for example. The public key of an encrypted content signature (ECS) issuing device (Encrypted Content Signature Issuer) 102 is stored in a public key certificate. Note that the secret key corresponding to the public key stored in this public key certificate is also provided to the encrypted content signature (ECS) issuing device (Encrypted Content Signature Issuer) 102 from the (A) License Issuing Device (LA) 101.

2. Overview of Generation Processing and Data Configuration of Encrypted Content Signature File (ECS File)

Next, overview of the generation processing and data configuration of the encrypted content signature file (ECS file) will be described with reference to FIG. 2. As described with reference to FIG. 1, based on the generation request from the content providing device (Content Server) 103, the encrypted content signature (ECS) issuing device (Encrypted Content Signature Issuer) 102 generates an encrypted content signature file (ECS file).

For example, in the case of providing a content such as a new movie content or the like to a user device 104, the content providing device (Content Server) 103 performs generation request of an encrypted content signature file (ECS file) corresponding to the content thereof to the encrypted content signature (ECS) issuing device (Encrypted Content Signature Issuer) 102.

In response to this request, the encrypted content signature (ECS) issuing device (Encrypted Content Signature Issuer) 102 generates an encrypted content signature file (ECS file) to provide to the content providing device (Content Server) 103.

Figure 2:
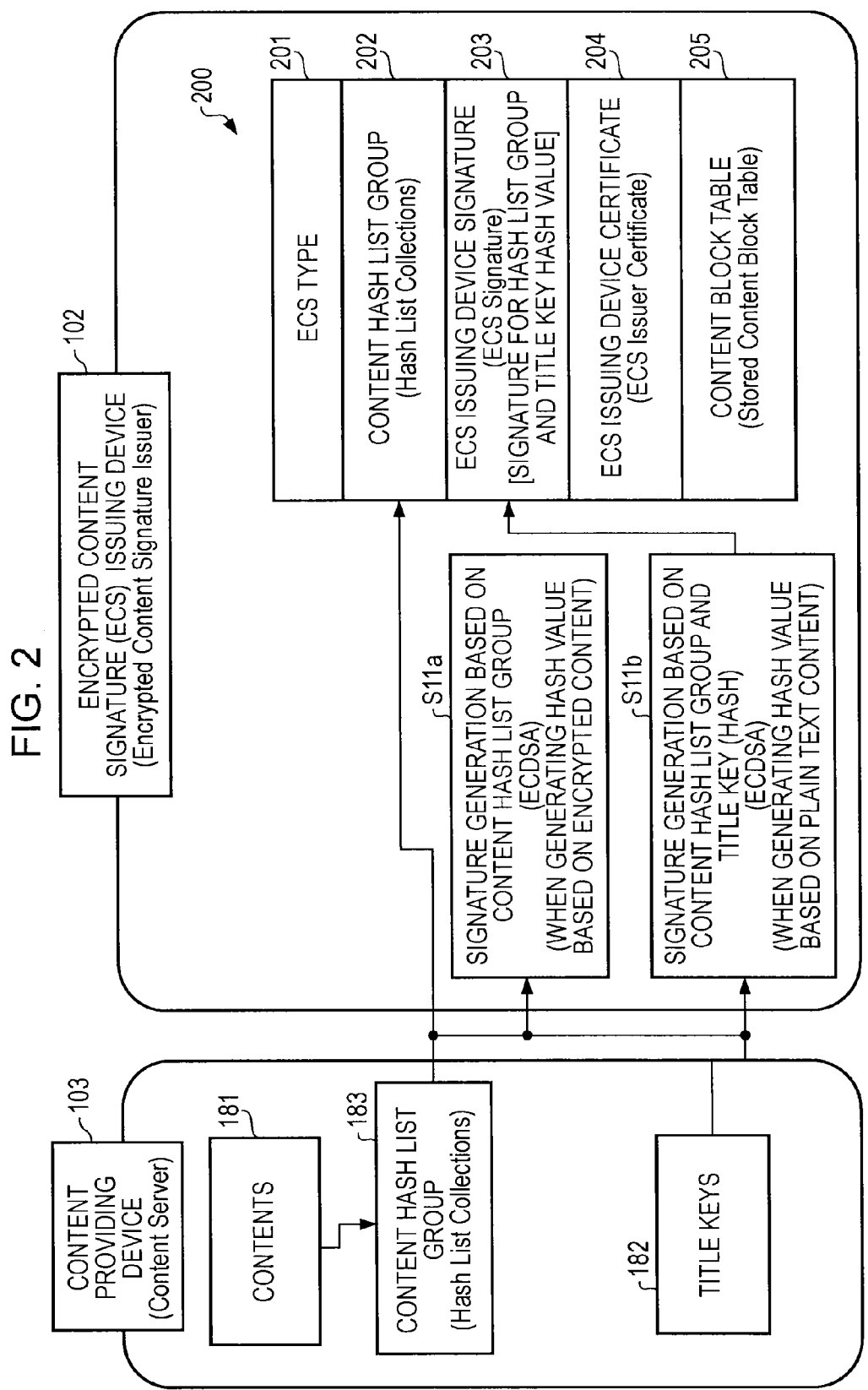
FIG. 2 is a diagram for describing the overview of the generation processing and data configuration of an encrypted content signature file (ECS file)

FIG. 2 is a diagram for describing processing that the content providing device (Content Server) 103 and encrypted content signature (ECS) issuing device (Encrypted Content Signature Issuer) 102 execute with this encrypted content signature file (ECS file) generation processing.

In the case of performing generation request for a new encrypted content signature file (ECS file), as illustrated in FIG. 2, the content providing device (Content Server) 103 generates a content hash list group (Hash List Collections) 183 including a hash value generated based on the configuration data (content block) of a content 181.

Note that the content hash list group (Hash List Collections) 183 is generated with one of the following two different settings.

Setting Example 1

A content hash list group in which a hash value generated based on the configuration data (content block) of an encrypted content is stored Setting Example 2

A content hash list group in which a hash value generated based on the configuration data (content block) of a plain text (unencrypted) content is stored The content hash list group 183 is generated with one of the above two different settings. In either case, the content providing device (Content Server) 103 generates a content hash including a great number of hash values generated based on a great number of content blocks which is the configuration data of the content 181, and generates a content hash list group (Hash List Collections) 183 including these hash values.

The content providing device (Content Server) 103 provides the generated content hash list group (Hash List Collections) 183 to the encrypted content signature (ECS) issuing Device (Encrypted Content Signature Issuer) 102.

Further, in the case of having generated a content hash list group (Hash List Collections) 183 in which a hash value generated based on a plain text content is stored, the content providing device (Content Server) 103 provides a title key 182 which is an encryption key as to the content 181, or the hash value of the title key to the encrypted content signature (ECS) issuing device (Encrypted Content Signature Issuer) 102.

The content hash list group (Hash List Collections) 183 is data including a hash value generated based on the configuration data of a content to be provided to the user device, and specifically, a content generated based on a content such as a movie or the like to be played at the user device, and attribute information thereof.

Note that the attribute information includes attribute information such as the position information of a content block where a hash value has been calculated, or the like.

The encrypted content signature (ECS) issuing device (Encrypted Content Signature Issuer) 102 generates, in step S11a or step S11b illustrated in FIG. 2, a signature as to the data received from the content providing device (Content Server) 103.

The generated signature data is generated as different signature data according to the setting mode of the above two content hash list groups (Hash List Collections) 183.

Setting Example 1

In the case that a content hash list group in which a hash value generated based on the configuration data (content block) of an encrypted content is stored has been generated, the processing in step S11a illustrated in FIG. 2 is executed. That is to say, signature processing is performed with only a content hash list group being taken as signature object data.

A signature is generated by applying the secret key held by the encrypted content signature (ECS) issuing device (Encrypted Content Signature Issuer) 102. For example, signature generation in accordance with the ECDSA algorithm is performed.

Setting Example 2

In the case that a content hash list group in which a hash value generated based on the configuration data (content block) of a plain text (non-encrypted) content is stored has been generated, the processing in step S11b illustrated in FIG. 2 is executed.

That is to say, signature processing is performed with the content hash list group and title key (hash) being taken as signature object data.

A signature is generated by applying the secret key held by the encrypted content signature (ECS) issuing device (Encrypted Content Signature Issuer) 102. For example, signature generation in accordance with the ECDSA algorithm is performed.

The generated signature is, as illustrated in FIG. 2, set as the configuration data of an encrypted content signature file (ECS file) 200. As illustrated in FIG. 2, the encrypted content signature file (ECS file) 200 that the encrypted content signature (ECS) issuing device (Encrypted Content Signature Issuer) 102 generates includes the following data.

(1) ECS type 201
(2) Content Hash List Group (Hash List Collections) 202
(3) ECS Issuing Device Signature (ECS Signature) 203
(4) ECS Issuing Device Certificate (ECS Issuer Certificate) 204
(5) Content Block Table (Stored Content Block Table) 205

The above each data is included in the encrypted content signature file (ECS file) 200. Note that the above data in (1) through (5) indicates the principal data included in the encrypted content signature file (ECS file) 200, and various types of data is included in the encrypted content signature file (ECS file) 200 other than the data in (1) through (5). The specific format of the encrypted content signature file (ECS file) will further be described in the subsequent stage.

The above data in (1) through (5) will be described.
(1) ECS Type 201

The ECS type 201 is information indicating the type of the encrypted content signature file (ECS file) 200.

Specifically, for example, in the case that the content has list group (Hash List Collections) 202 in which the ECS file is stored is a content hash list group in which a hash value generated based on the configuration data (content block) of an encrypted content is stored, "0" is stored.

In the case that the content has list group (Hash List Collections) 202 in which the ECS file is stored is a content hash list group in which a hash value generated based on the configuration data (content block) of a plain text content is stored, "1" is stored.

(2) Content Hash List Group (Hash List Collections) 202

The content hash list group (Hash List Collections) 202 is data (=the content hash list group (Hash List Collections) 183 illustrated in FIG. 2) generated by the content providing device (Content Server) 103, and is, as described above, data including a hash value generated based on the configuration data of a content to be provided to a user device, and specifically, a content to be generated based on a content such as a movie or the like to be played at a user device, and attribute information thereof (information such as offset and length indicating the position and so forth of a content block serving as the hash value generation source, and so forth).

(3) ECS Issuing Device Signature (ECS Signature) 203

The ECS issuing device signature (ECS Signature) 203 is signature data generated in step S11 illustrated in FIG. 2.

This signature data becomes different signature data according to the value of the above ECS type. That is to say, the following settings are available.

(ECS type=0)

This is a case where the content hash list group 202 is a content hash list group in which a hash value generated based on the configuration data (content block) of an encrypted content is stored, where signature data generated with the content hash list group alone being taken as signature object data is stored.

(ECS type=1)

This is a case where the content hash list group 202 is a content hash list group in which a hash value generated based on the configuration data (content block) of a plain text content is stored, where signature data generated with the content hash list group and title key (hash) being taken as signature object data is stored.

According to the ECS type, either of the above signature data is stored. Note that the signature data is signature data generated by applying the secret key held by the encrypted content signature (ECS) issuing device (Encrypted Content Signature Issuer) 102.

(4) ECS Issuing Device Certificate (ECS Issuer Certificate) 204

The ECS issuing device certificate (ECS Issuer Certificate) 204 is a public key certificate corresponding to the ECS issuing device 102, in which the public key of the ECS issuing device 102 is stored.

(5) Content Block Table (Stored Content Block Table) 205

In the case that a hash list corresponding to multiple contents is recorded in the above content hash list group (Hash List Collections) 202, the content block table (Store Content Block Table) 205 is set as a field where correspondence information between each hash list and a content is recorded.

Note that as described above, various types of data are included in the encrypted content signature file (ECS) file 200 other than the data in (1) through (5). The specific format (syntax) of the encrypted content signature file (ECS file) will further be described in the subsequent stage.

3. Generation of Encrypted Content Signature File (ECS File), Providing of Contents, and Use Processing Sequence As described above, for example, in the event of providing a content such as a new movie content or the like to the user device 104, the content providing device (Content Server) 103 illustrated in FIG. 1 outputs a generation request for the encrypted content signature file (ECS file) corresponding to the content thereof to the encrypted content signature (ECS) issuing device (Encrypted Content Signature Issuer) 102.

In response to this request, the encrypted content signature (ECS) issuing device (Encrypted Content Signature Issuer) 102 generates an encrypted content signature file (ECS file) to provide to (C) Content Providing Device (Content Server) 103. The content providing device (Content Server) 103 provides this to the user device (content playing device) 104 along with the encrypted content.

The user device (content playing device) 104 executes, before playing the content, hash value matching processing using a hash value stored in the encrypted content signature file (ECS file), and further performs signature verification processing as to the signature stored in the encrypted content signature file (ECS file).

Only in the case that matching achievement is confirmed by the matching processing of these hash values, and further signature verification is achieved by signature verification processing, decryption and playback of a content can be executed. In the case that either of the hash matching or signature verification has not been successful, playback of a content is forbidden.

Figure 3:
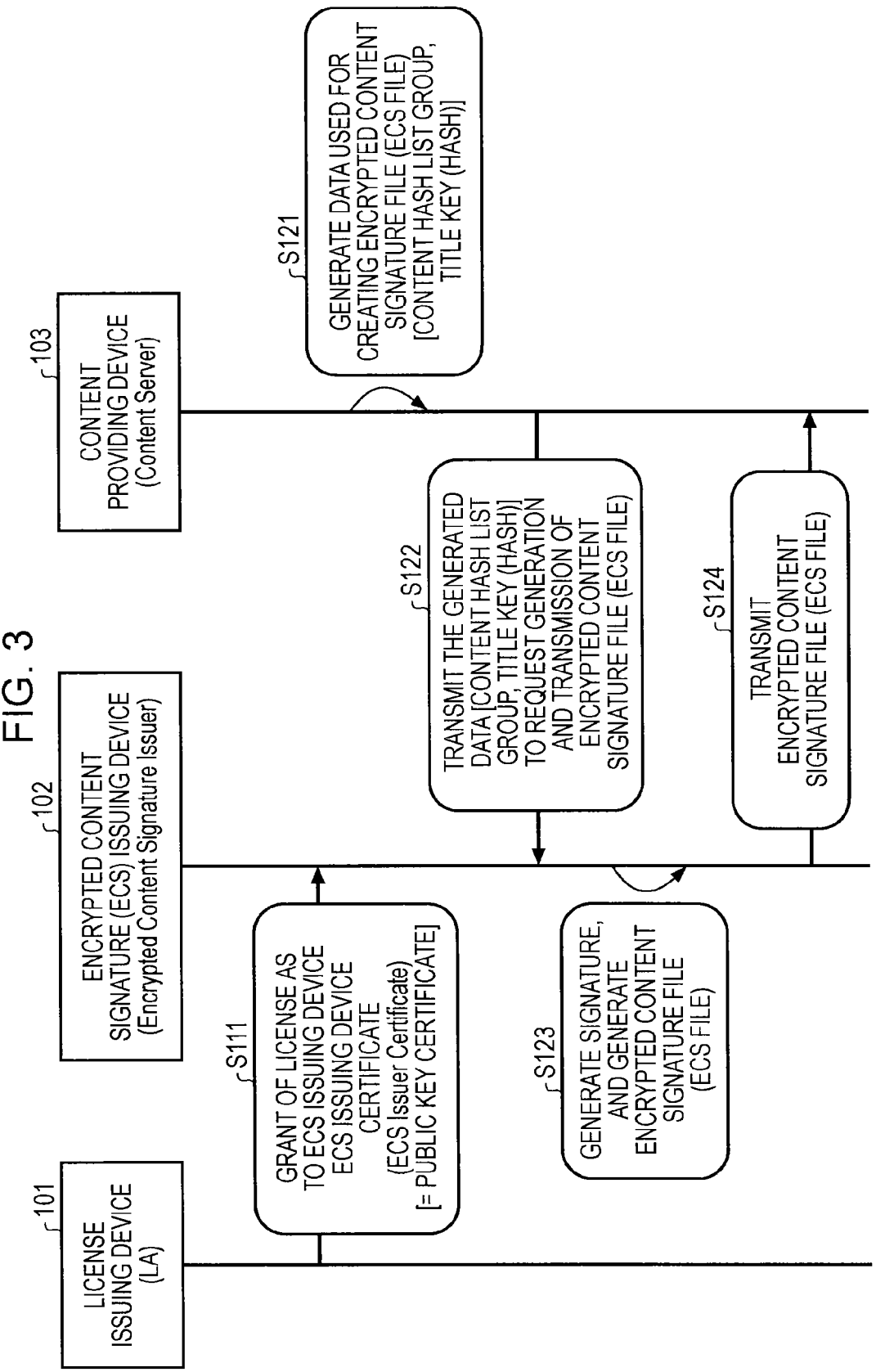
FIG. 3 is a sequence chart for describing generation of the encrypted content signature file (ECS file), providing of contents, and a usage processing sequence.

Hereinafter, generation of an encrypted content signature file (ECS file), providing of contents, and use processing sequence will be described with reference to the sequence charts illustrated in FIGS. 3 and 4. FIG. 3 illustrates, from the left, the devices of License issuing device 101, Encrypted content signature (ECS) issuing device 102, and Content providing device 103, and illustrates the processes in steps S111, and S121 through S124 as time series processes. These processing steps will now be described.

Step S111

Step S111 is processing wherein the license issuing device 101 issues a license (ECS issuing device certificate) to the encrypted content signature (ECS) issuing device 102.

As previously described with reference to FIG. 1, the license issuing device 101 provides a license serving as an issuance permit for ECS file to the encrypted content signature (ECS) issuing device 102.

The license issuing device (LA) 101 confirms propriety of the encrypted content signature (ECS) issuing device 102 in accordance with a predetermined license issuance sequence, and in the case that propriety has been confirmed, issues a license to the encrypted content signature (ECS) issuing device.

Note that the license is specifically a public key certificate to which the signature according to the secret key of the license issuing device (LA) 101 is added, for example. The public key of the encrypted content signature (ECS) issuing device (Encrypted Content Signature Issuer) 102 is stored in the public key certificate. Note that the secret key corresponding to the public key stored in this public key certificate is also provided to the encrypted content signature (ECS) issuing device (Encrypted Content Signature Issuer) 102 from (A) license issuing device (LA) 101.

Steps S121 through S124 are a sequence for the generation processing of the encrypted content signature file (ECS) file 200 illustrated in FIG. 2.

In the case that the content providing device 103 provides a new content to the user device for example, this processing is successively executed according to each provided content to obtain the encrypted content signature file (ECS file) 200 corresponding to the new content thereof.

This processing is processing corresponding to processing described with reference to FIG. 2, and is executed between the encrypted content signature (ECS) issuing device 102 and the content providing device 103.

First, in step S121, the content providing device 103 generates data used for creating each encrypted content signature file (ECS file).

Specifically, the content providing device 103 executes the generation processing of the content hash list group (Hash List Collections) 183, or the like, described with reference to FIG. 2.

As described above, the content hash list group (Hash List Collections) 183 illustrated in FIG. 2 is data including a hash value generated based on the configuration data of a content generated based on a content to be provided to the user device, and specifically, a content such as a movie or the like to be played at the user device, and attribute information thereof.

The attribute information includes attribute information such as the position information of a content block where a hash value has been calculated, or the like, for example.

Note that in the event that the content providing device 103 has generated a content hash list group (Hash List Collections) in which a hash value generated based on a plain text content is stored, in step S121, the content providing device 103 also generates a title key to be applied to the encryption and decryption processing of contents, or the hash value of the title key as data to be provided to the encrypted content signature (ECS) issuing device 102.

Next, in step S122, the content providing device 103 transmits the generated data to the encrypted content signature (ECS) issuing device 102, and performs generation and transmission request of the encrypted content signature file (ECS file).

Next, in step S123, the encrypted content signature (ECS) issuing device 102 performs signature generation processing as to the data received from the content providing device 103, i.e., executes signature verification processing in step S11a or step S11b described with reference to FIG. 2.

In the case that the content hash list group generated by the content providing device 103 is a content hash list group in which a hash value generated based on the configuration data (content block) of an encrypted content is stored, the encrypted content signature (ECS) issuing device 102 performs signature processing with the content hash list group alone being taken as signature object data.

Also, in the case that the content hash list group generated by the content providing device 103 is a content hash list group in which a hash value generated based on the configuration data (content block) of a plain text (non-encrypted) content is stored, the encrypted content signature (ECS) issuing device 102 performs signature processing with the content hash list group and title key (hash) being taken as signature object data.

A signature is generated by applying the secret key held by the encrypted content signature (ECS) issuing device (Encrypted Content Signature Issuer) 102. For example, signature generation in accordance with the ECDSA algorithm is performed.

Further, the encrypted content signature (ECS) issuing device 102 generates an encrypted content signature file (ECS file) descried with reference to FIG. 2, and in step S124 transmits the generated encrypted content signature file (ECS file) to the content providing device 103.

Next, providing of a content from the content providing device 103 to the user device 104, and the content playback sequence at the user device 104 will be described with reference to FIG. 4.

Figure 4:
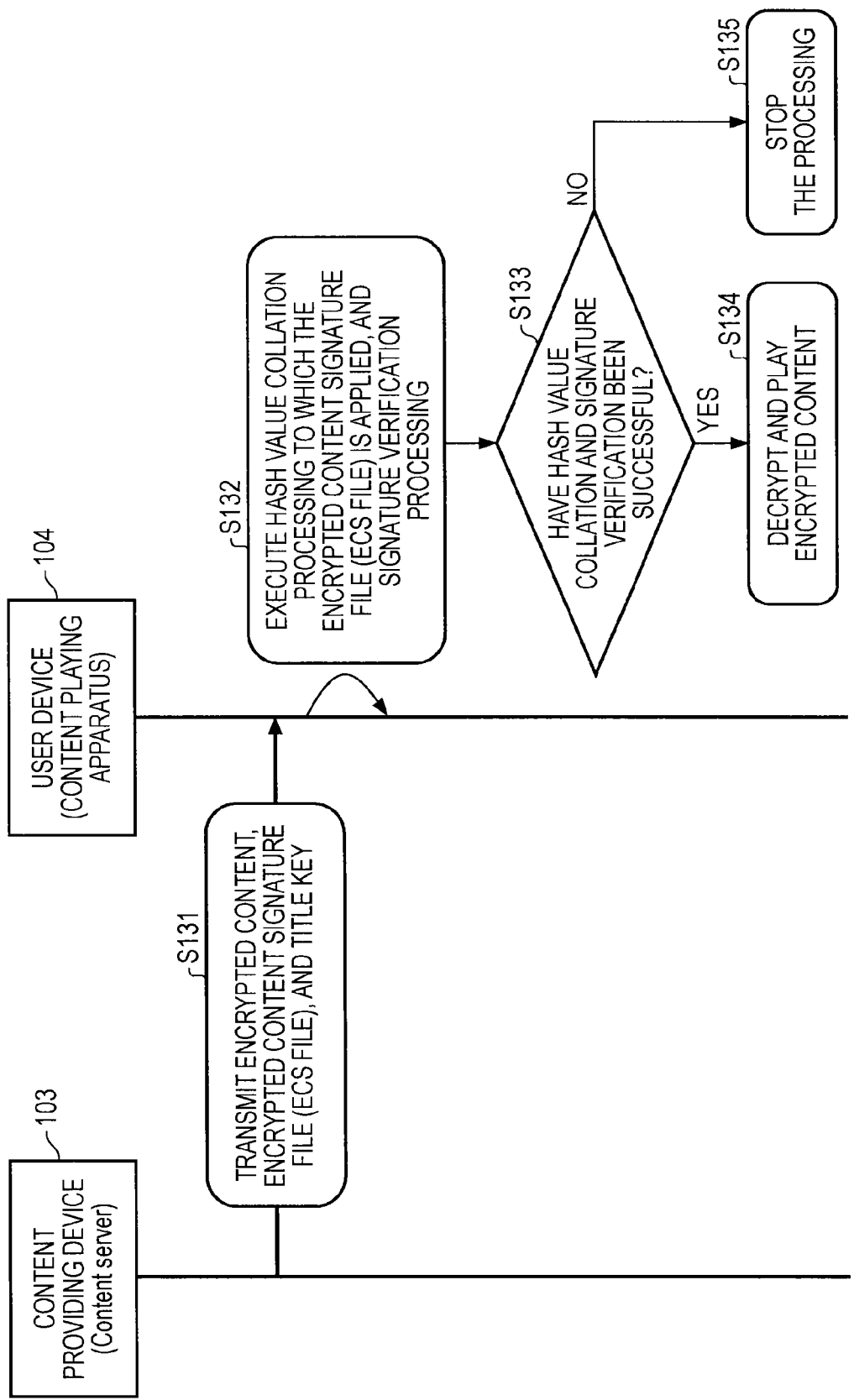
FIG. 4 is a sequence chart for describing generation of the encrypted content signature file (ECS file), providing of contents, and the usage processing sequence.

FIG. 4 illustrates, from the left,
Content providing device 103, and
User device 104.

First, in step S131, the content providing device 103 transmits the following data to the user device.
(1) Encrypted content
(2) Encrypted content signature file (ECS file)
(3) Title key Now, let us say that content transmission request from the user device 104 to the content providing device 103 has been executed as preprocessing of the processing in step S131. The content providing device 103 provides the content according to the request from the user device.

Note that, (1) Encrypted content, that the content providing device 103 transmits in step S131 is a content encrypted by the above "(3) Title key" to be set according to a content.

Also, (2) Encrypted content signature file (ECS file) is a file generated according to the above (1) Encrypted content, in which the configuration data of the encrypted content signature file (ECS file) 200 illustrated in FIG. 2 is stored, i.e., a file including data such as a hash value generated based on the configuration data of (1) Encrypted content, and so forth.

The user device 104 receives these data to store to a medium, for example, such as a hard disk or the like.

Thereafter, the user device 104 executes processing in step S132 and thereafter illustrated in FIG. 4 at the time of executing content playing processing.

In step S132, the user device 104 reads out an encrypted content signature file (ECS file) corresponding to a content to be played to perform the hash value matching processing and signature verification processing.

The hash value matching processing is processing for selectively obtaining a stipulated number (k) or more of multiple hash values from a content hash list group that is the configuration data of the encrypted content signature file (ECS file) illustrated in FIG. 2, and for executing matching processing between the obtained hash values and the hash values calculated based on the received content.

The signature verification processing is processing for performing signature verification of the ECS issuing device signature 203 that is the configuration data of the encrypted content signature file (ECS file) 200 illustrated in FIG. 2.

Note that this signature is the signature generated by using the secret key of the ECS issuing device 102, and the public key of the ECS issuing device is applied to this signature verification processing.

The public key of an ECS issuing device can be obtained from the ECS issuing device certificate (public key certificate) 204 that is the configuration data of the encrypted content signature file (ECS file) 200.

In the event that determination is made in step S133 that both of the hash value matching and signature verification have been successful, the user device 104 proceeds to step S134, executes decryption processing on the encrypted content to which the title key has been applied, and executes playing processing and use processing of the decrypted content.

On the other hand, in the event that determination is made in step S133 that either the hash value matching or the signature verification has failed, determination in step S133 becomes No, the user device 104 proceeds to step S135, and the playback and use processing of the encrypted content is stopped.

Note that as described above, in the case that the hash values stored in the content hash list group (Hash List Collections) 183 make up a plain text content, the ECS issuing device signature 203 that is the configuration data of the encrypted content signature file (ECS file) 200 is a signature generated based on data including the hash values and title key based on the configuration data of a content. Accordingly, in the event that signature verification success has been determined in step S133, confirmation may be made that both of the content and title key have not been tampered, and confirmation is made that the combination of the content and title key is also a regular combination.

On the other hand, in the case that signature verification has not been achieved in step S133, determination is made that the generation source data of the signature data, i.e., at least either the configuration data of the content or the title key described with reference to FIG. 2 might have been tampered.

In this case, determination in step S133 becomes No, the user device 104 proceeds to step S135, and the playback and use processing of the encrypted content is stopped.

Note that a playing processing program in accordance with a sequence for executing decryption and playback of a content under the condition of the signature verification of the encrypted content signature file (ECS file) is stored in the user device (content playing device) 104, and the signature verification of the encrypted content signature file (ECS file), and content playback are executed in accordance with this playing processing program.

In the case that the signature verification of the encrypted content signature file (ECS file) has not been successful, content playback is forbidden.

In this way, with an arrangement of the present disclosure,
(1) Content, and
(2) Title Key Serving as Encryption Key to Be Applied to Encryption and Decryption Processing of Content, signature verification is executed on the signature generated based on these data.

Only in the case that the content and title key, a combination of these two types of data has been confirmed to be a correct combination by this verification processing, playback and use of the content is permitted at the user device.

Accordingly, in the case of an unauthorized content and title key combination different from the original content and title key combination, the signature verification is not achieved, and such unauthorized content use is prevented.

Note that, with the sequence chart in FIG. 4, though description has been made as a processing example wherein the content providing device 103 provides data such as a content or the like to the user device 104, for example, by communication processing via a network, the content providing mode is not restricted to such providing processing via a network.

For example, providing processing via a medium such as DVD, BD, flash memory, or the like, and a providing arrangement according to broadcasting may be applicable.

4. Generation Processing of Encrypted Content Signature File (ECS File), and Detailed Configuration of ECS File Next, the generation processing of an encrypted content signature file (ECS file), and the detailed configuration of the ECS file will be described with reference to FIG. 5 and thereafter.

Figure 5:
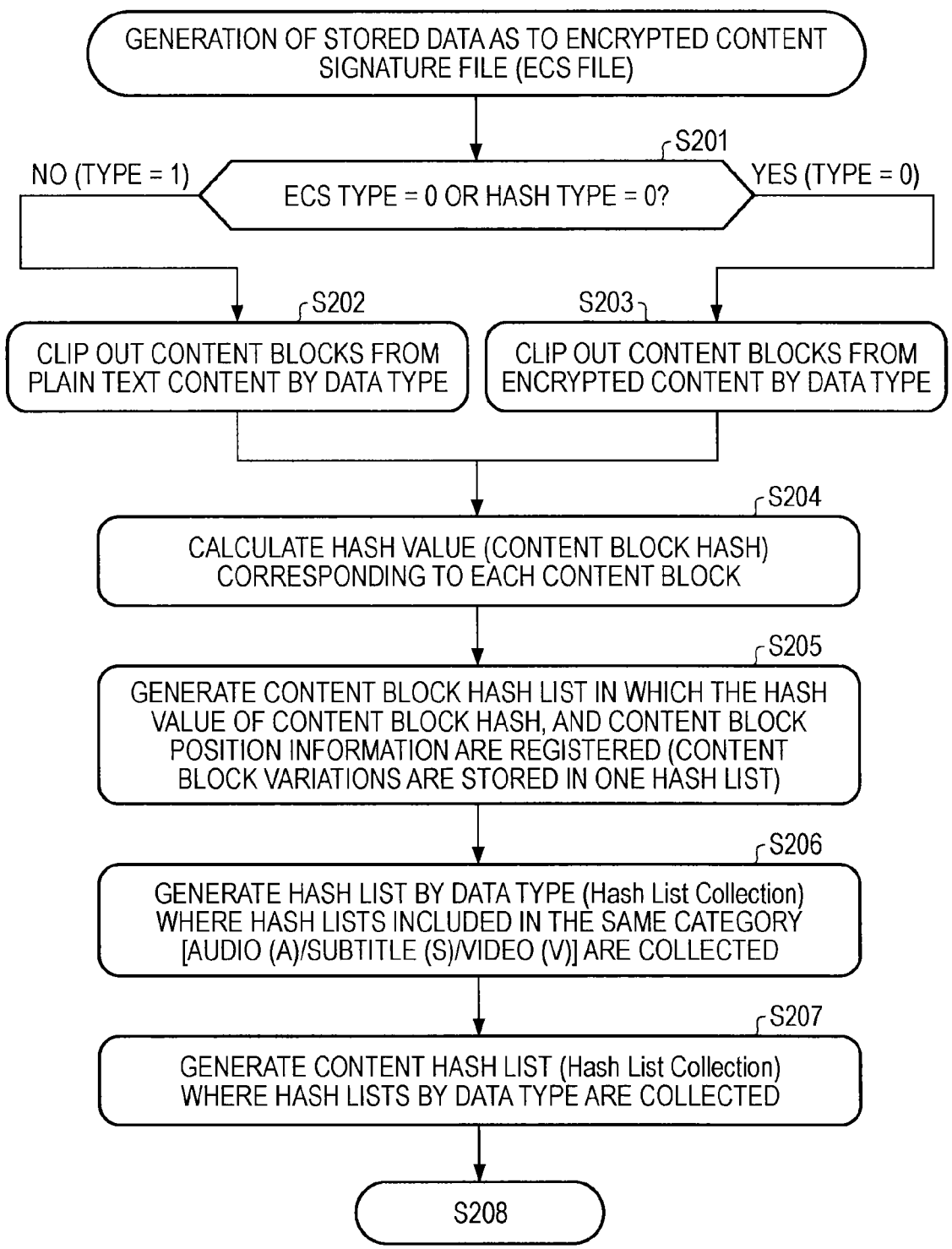
FIG. 5 is a diagram illustrating a flowchart for describing the details of processing to be executed for obtaining the encrypted content signature file (ECS file)
Figure 6:
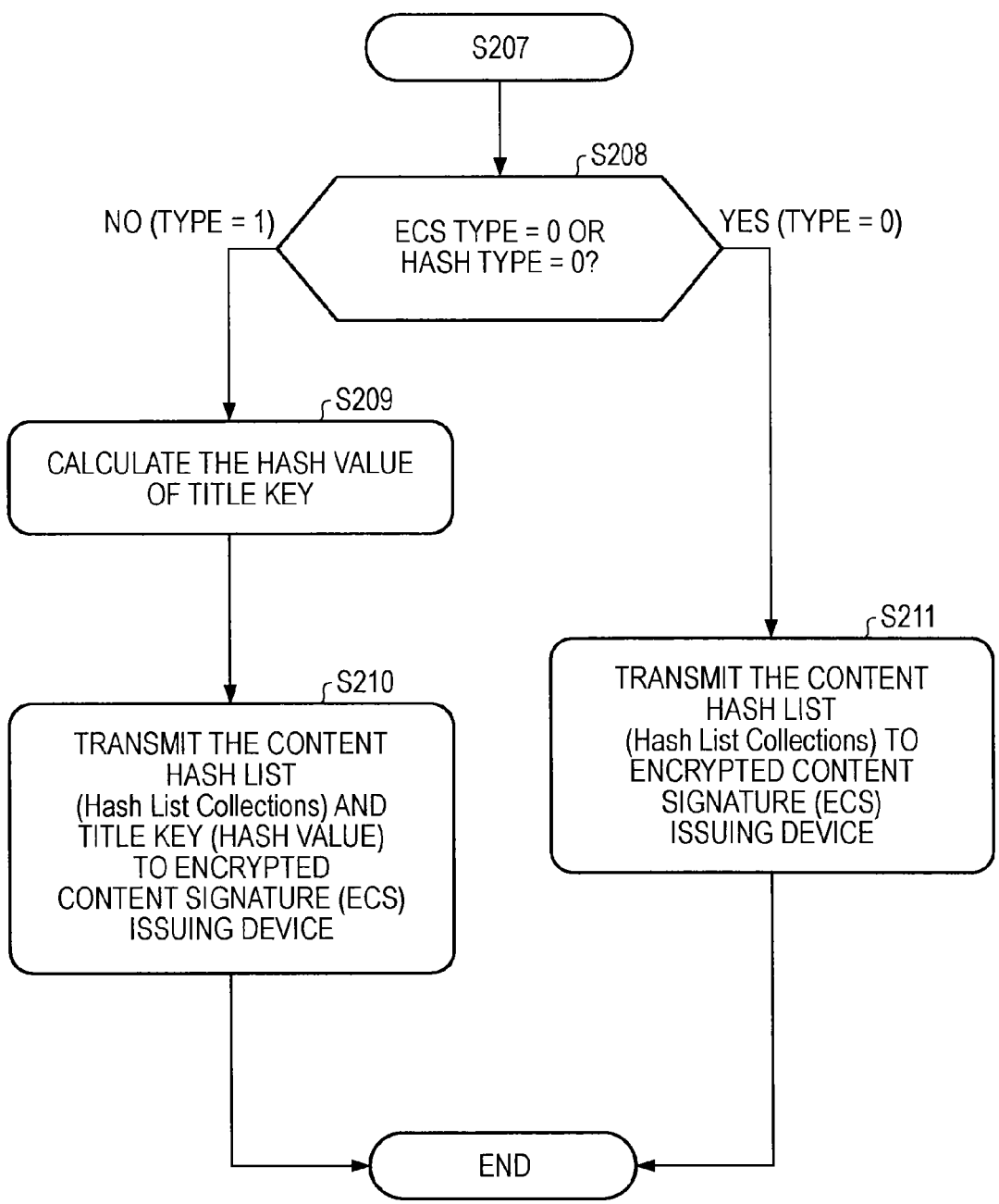
FIG. 6 is a diagram illustrating a flowchart for describing the details of the processing to be executed for obtaining the encrypted content signature file (ECS file)

FIGS. 5 and 6 are flowcharts for describing the detailed sequence for the processing in step S121 in the sequence chart illustrated in FIG. 3. Specifically, FIGS. 5 and 6 are flowcharts for describing, for example, in the event that the content providing device 103 provides a new content to the user device, the details of processing to be executed for obtaining the encrypted content signature file (ECS file) 200 from the encrypted content signature (ECS) issuing device 102 illustrated in FIG. 2 corresponding to the new content thereof.

This processing is successively executed corresponding to each provided content at the content providing device 103, for example. Specifically, the generation processing of the content hash list group (Hash List Collections) 183 described with reference to FIG. 2, and so forth are included in this processing.

Hereinafter, the detailed configuration of the content hash list group (Hash List Collections) will be described with reference to the drawings of FIG. 7 and thereafter along with the flowcharts illustrated in FIGS. 5 and 6. Now, processing in each step in the flowchart in FIG. 5 will sequentially be described.

First, in step S201, the content providing device 103 determines the type (ECS type) of an encrypted content signature file (ECS file) to be generated. Specifically, the content providing device 103 determines the ECS type according to whether to generate a hash value to be stored in the content hash list group 202 to be set as the configuration data of the encrypted content signature file (ECS file) 200 illustrated in FIG. 2 based on the configuration data of an encrypted content or based on the configuration data of a plain text content.

Specifically, the ECS type is determined in accordance with the following settings.

ECS type=0: a hash value calculated from an encrypted content is stored in the content hash list group (Hash List Collections) 202 field.

ECS type=1: a hash value calculated from a plain text content before encryption is stored in the content hash list group (Hash List Collections) 202 field.

Note that the hash type is stipulated as the same type information as the ECS type, and this type is also determined according to the ECS type.

In the case of ECS type=1, the content providing device 103 proceeds to step S202 to execute processing for clipping a content block by data type from the plain text content.

In the case of ECS type=0, the content providing device 103 proceeds to step S203 to execute processing for clipping a content block by data type from the encrypted content encrypted by the title key.

The content providing device 103 executes processing for clipping a content block by data type from a content to be newly provided to the user device, e.g., a new content such as a movie or the like.

The data type is, as illustrated in FIG. 7 for example, the following data included in a content.
(A) Audio data
(S) Subtitle data
(V) Video data There are these three types of data. Note that the data type is not restricted to these three, and further other type classification may be performed. For example, audio and subtitle may be taken as classification settings by language.

As illustrated in FIG. 7, a content file, for example, such as a movie or the like includes the following three types of data.
(A) Audio data
(S) Subtitle data
(V) Video data Note that the content file illustrated in FIG. 7 is, in the case of ECS type=1, a plain text content, and in the case of ECS type=0, an encrypted content encrypted by a title key.

In steps S202 and S203, the content providing device 103 clips a content block that is the generation increment data of a hash value from the content file in FIG. 7. At this time, content blocks are set according to the type of data. That is to say, content blocks are set by the following data type.
(A) Audio data
(S) Subtitle data
(V) Video data The content blocks of audio data shall be A0, A1, A2, and so on.

The content blocks of subtitle data shall be S0, S1, S2, and so on.

The content blocks of video data shall be V0, V1, V2, and so on.

Next, in step S204, the content providing device 103 calculates hash values corresponding to the content blocks, i.e., a content block hash (Content Block Hash).

Specifically, the content providing device 103 calculates hash values by the following data type.

Content block hash (Content Block Hash) for audio corresponding to the content blocks of audio data: A0, A1, A2, and so on, Content block hash (Content Block Hash) for subtitle corresponding to the content blocks of subtitle data: S0, S1, S2, and so on, and Content block hash (Content Block Hash) for video corresponding to the content blocks of video data: V0, V1, V2, and so on.

Note that, as illustrated in FIG. 7, a content block serving as a hash value to be generated is partial data of a content file, and includes a data portion serving as a data portion serving as other than a hash value to be generated. The data portion serving as other than a hash value to be generated may be set as a region that can additionally be edited even after completion of a content file, for example, such as addition of remarks or the like.

Next, in step S205, the content providing device 103 generates a content block hash list in which the hash values of the content block hash calculated in step S204, content block position information, and so forth are registered.

A generation processing example of the content block hash list will be described with reference to FIG. 8. The content file illustrated in FIG. 8 is the same content file as illustrated in FIG. 7, and is a content where the following data blocks are set.
Content blocks of audio data: A0, A1, A2, and so on
Content blocks of subtitle data: S0, S1, S2, and so on
Content blocks of video data: V0, V1, V2, and so on In step S204, the content providing device 103 calculates a hash value regarding each of these content blocks.

In step S205, the content providing device 103 obtains attribute information corresponding to these hash values, and specifically, offset and length serving as the position information of a content block of which the hash value has been calculated to generate a hash list including a hash value, offset, and length. The offset is distance from the content head of a content block where a hash value has been calculated, and the length corresponds to the length of a content block.

Data with these information being registered in a manner correlated with a hash value serving as attribute information correlated with the hash value will be referred to as a hash list. The hash list is set as data corresponding to each content block.

As illustrated in FIG. 8, a hash list corresponding to each of the content blocks by each data type is generated as follows.
Hash list corresponding to subtitle block S0
Hash list corresponding to subtitle block S1
Hash list corresponding to audio block A0
Hash list corresponding to audio block A1
Hash list corresponding to video block V0
Hash list corresponding to video block V1

Each of the hash lists includes the following data.
(1) Hash value of a content block
(2) Offset of a content block
(3) Length of a content block Note that at the time of the generation processing of a hash list in step S205, content block variations are stored in one hash list.

A specific example of this processing will be described with reference to FIGS. 9A and 9B. Content configurations having a variation are illustrated in FIG. 9A.

Figure 9A:
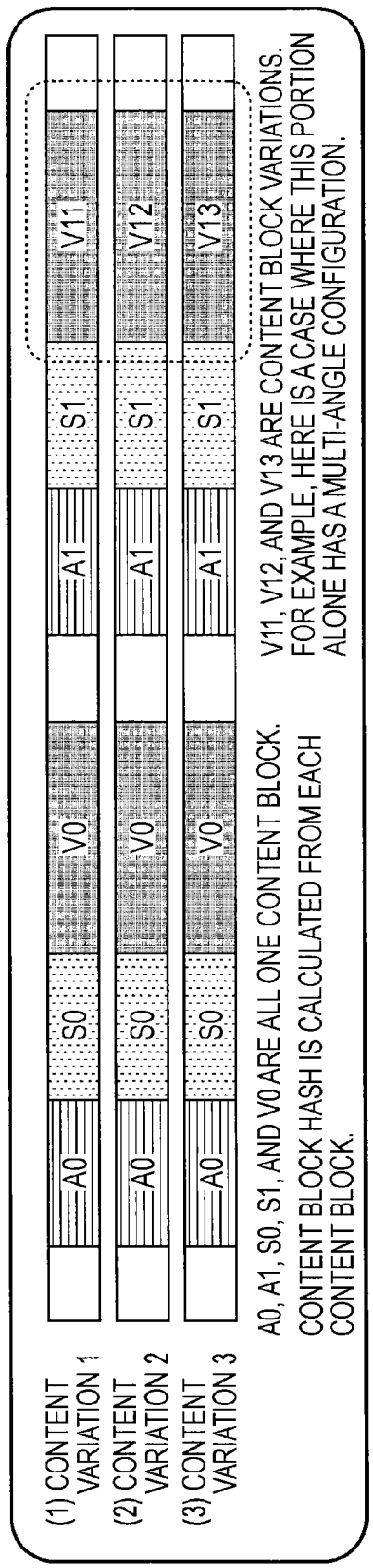
FIGS. 9A and 9B are diagrams for describing the detailed configuration of the content hash list group (Hash List Collections)

For example, though the following three contents illustrated in FIG. 9A
(1) Content variation 1
(2) Content variation 2
(3) Content variation 3
are specifically basically the same content, for example, with a portion of a video being configured of a video taken from a different direction, which are so-called multi-angle contents.

Figure 9B:
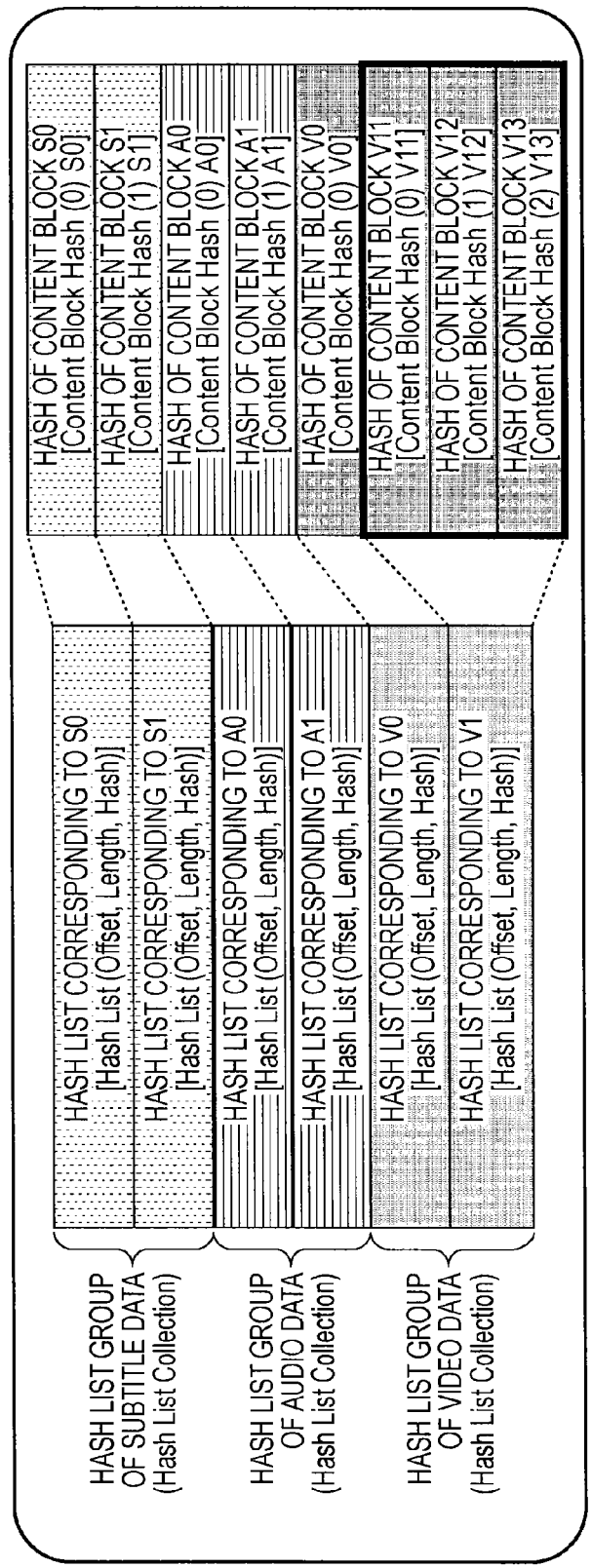

Three pieces of video data of the video content blocks (V11, V12, V13) illustrated in FIGS. 9A and 9B correspond to video data each taken from a different direction. The other data portions (A0, S0, V0, A1, S1, and so on) are all the same data.

The three pieces of video data of the content blocks (V11, V12, and V13) are switchable playable video data according to a user's preference, for example.

Such a content including multiple playable data will be referred to as a content having a variation, and such a content block variation is stored in one hash list.

As illustrated in FIG. 9B,
Hash of content block V11,
Hash of content block V12,
Hash of content block V13,
these hash values in increments of blocks are individually calculated, but these are set as one hash list.

These are set as "hash list corresponding to V1" illustrated in the lowest tier of the hash list illustrated in FIG. 9B.

The hash value of V11, hash value of V12, hash value of V13, and offset and length information are stored in this "hash list corresponding to V1".

Next, in step S206, the content providing device 103 generates a hash list by data type (Hash List Collection) where hash lists having the same category [(Audio (A)/Subtitle (S)/Video (V)] are collected.

As illustrated in FIGS. 8, 9A, and 9B, hash lists are generated by data type and also by content block.

The content providing device 103 collects these hash lists by data type to generate a hash list group (Hash List Collection) by data type. According to this processing, as illustrated in FIGS. 8, 9A, and 9B,
(1) Hash list group (Hash List Collection) of subtitle data
(2) Hash list group (Hash List Collection) of audio data
(3) Hash list group (Hash List Collection) of video data these hash list groups (Hash List Collection) by data type are generated.

Further, in step S207, the content providing device 103 generates a content hash list group (Hash List Collections) where hash list groups (Hash List Collection) by data type are collected.

A generation processing example of a content hash list group (Hash List Collections) will be described with reference to FIG. 10. FIG. 10 illustrates the following.
(A) Content block hash that is a hash value in increments of content blocks by data type
(B) Hash list in increments of content blocks including a hash value, offset, and length
(C) Hash list group by data type
(D) Content hash list group (Hash List Collections) 183

(D) Content Hash List Group (Hash List Collections) 183 corresponds to the content hash list group 183 described with reference to FIG. 2, and is, as illustrated in FIG. 2, data including a hash value generated by using the content 181.

(A) Content block hash that is a hash value in increments of content blocks by data type indicates an example corresponding to a content having a variation described with reference to FIGS. 9A and 9B.

In step S204 of the flow illustrated in FIG. 5, the content providing device 103 calculates (A) Content block hash that is a hash value in increments of content blocks by data type indicated in FIG. 10.

In step S205, the content providing device 103 generates (B) Hash list in increments of content blocks including a hash value, offset, and length indicated in FIG. 10.

In step S206, the content providing device 103 generates (C) Hash list group by data type indicated in FIG. 10.

In step S207, the content providing device 103 generates (D) Content Hash List Group (Hash List Collections) 183 indicated in FIG. 10.

That is to say, (D) Content Hash List Group (Hash List Collections) 183 indicated in FIG. 10 is data that hash list groups by data type indicated in (C) in FIG. 10 are collected.

Next, the flowchart illustrated in FIG. 6 continuous from the flowchart illustrated in FIG. 5 will be described.

In step S208 illustrated in FIG. 6, the content providing device 103 determines the ECS type (=hash type) of an encrypted content signature file (ECS file) to be scheduled for generation.

In the case of ECS type=1 wherein hash value calculation processing for a plain text content is performed, the content providing device 103 proceeds to step S209.

In the case of ECS type=0 wherein hash value calculation processing for an encrypted content is performed, the content providing device 103 proceeds to step S211.

In the case of ECS type=1 wherein an ECS file in which a hash value for a plain text content is stored is generated, the content providing device 103 proceeds to step S209, and calculates the hash value of the title key that is the encryption key to be applied to encryption and decryption processing of a content.

Further, in step S210, the content providing device 103 transmits the content hash list group generated in step S207, and the title key hash value generated in step S209 to the encrypted content signature (ECS) issuing device.

On the other hand, in the case of ECS type=0 wherein an ECS file in which a hash value for an encrypted content is stored is generated, the content providing device 103 proceeds to step S211, and transmits the content hash list group generated in step S207 to the encrypted content signature (ECS) issuing device.

Note that, with regard to the title key transmitted in step S210, an arrangement may be made wherein the content providing device generates a hash value and transmits to the encrypted content signature (ECS) issuing device, or an arrangement may be made wherein the title key itself is transmitted from the content providing device to the encrypted content signature (ECS) issuing device, and a title key hash value is generated at the encrypted content signature (ECS) issuing device. However, in the case of performing transmission of the title key itself, data providing processing has to be performed without leaks, e.g., processing for setting a secure communication path for transmission, or the like.

As illustrated in FIG. 11, with generation of signature data using the encrypted content signature (ECS) issuing device 102, different signature data is generated according to the set mode of the content hash list group (Hash List Collections).
(ECS type=0)

A content hash list group in which a hash value generated based on the configuration data (content block) of an encrypted content is stored is generated to perform signature processing with the content hash list group alone being taken as signature object data as illustrated in step S11a in FIG. 11.
(ECS type=1)

A content hash list group in which a hash value generated based on the configuration data (content block) of a plain text (non-encrypted) content is stored is generated to perform signature processing with the content hash list group and title key (hash) being taken as signature object data as illustrated in step S11b in FIG. 11.

The encrypted content signature (ECS) issuing device 102 stores the content hash list group (Hash List Collection) 183 and the generated signature (ECS issuing device signature) as the configuration data of the encrypted content signature file (ECS file) 200.

The encrypted content signature (ECS) issuing device 102 further sets, as illustrated in FIG. 11, the other data as the configuration data of the encrypted content signature file (ECS file) 200, and finally generates the encrypted content signature file (ECS file) 200 including at least the following data to transmit to the content providing device 103.

(1) ECS type 201
(2) Content hash list group 202
(3) ECS issuing device signature 203
(4) ECS issuing device certificate 204
(5) content block table 205

5. Generation Processing Example of Signature Data

As described with reference to FIG. 11, upon receiving (ECS type=0) content hash list group (Hash List Collection) 183 or (ECS type=1) content hash list group (Hash List Collection) 183 and title key (hash) from the content providing device 103, the encrypted content signature (ECS) issuing device 102 generates signature data as to this received data.

An example of this signature data generation processing will be described with reference to FIG. 12.

Figure 12:
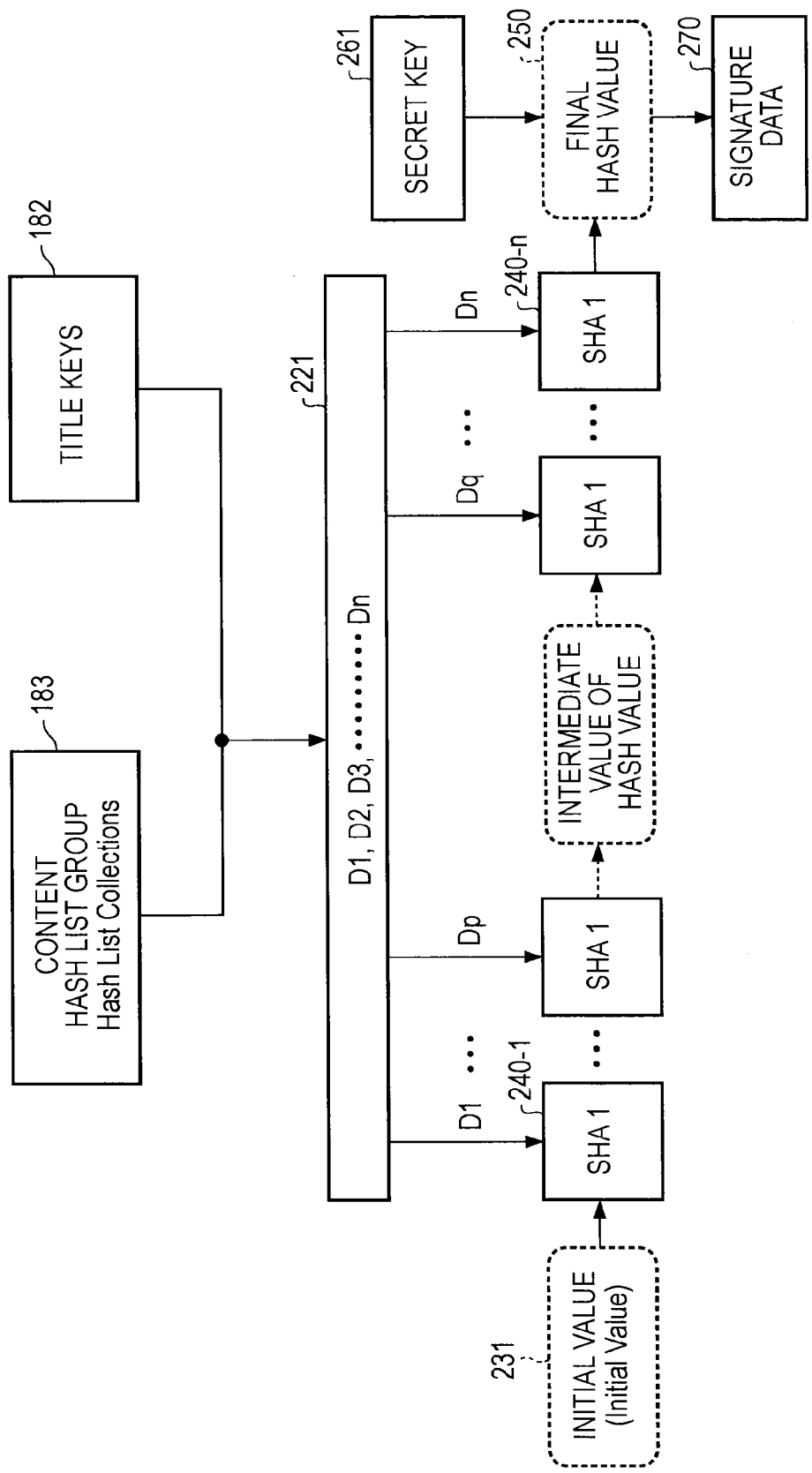
FIG. 12 is a diagram for describing a generation processing example of signature data.

The content hash list group (Hash List Collection) 183 indicated in FIG. 12 is data to be received from the content providing device 103, and is data including a hash value for content block by data type (audio/subtitle/video), and attribute information (offset, length).

The encrypted content signature (ECS) issuing device 102 performs, in the case of ECS type=0, signature processing with the content hash list group 183 alone in which a hash value generated based on the configuration data (content block) of an encrypted content is stored being taken as signature object data.

The encrypted content signature (ECS) issuing device 102 performs, in the case of ECS type=1, signature processing with the content hash list group 183 in which a hash value generated based on the configuration data (content block) of a plain text (non-encrypted) content is stored, and the title key (hash) 182 being taken as signature object data.

The encrypted content signature (ECS) issuing device 102 generates divided data 221 obtained by dividing the signature object data into predetermined data increments.

For example, the encrypted content signature (ECS) issuing device 102 divides the signature object data into data D1, D2, D3, . . . Dn in increments of the number of bits whereby an SHA-1 algorithm that is a hash generating algorithm can be applied.

Further, as illustrated in FIG. 12, a hash value is calculated by sequentially applying SHA-1 executing units 240-1 through 240-n to the divided data 221.

Note that a value provided from the license issuing device (LA) 101 is applied as an initial value 231.

First, the SHA-1 algorithm is executed by applying the initial value 231 and data D1 to calculate an intermediate hash value. The SHA-1 algorithm is executed by inputting this calculated value as an initial value as to the SHA-1 executing unit to input the next data D2 to calculate an intermediate hash value. This is sequentially repeated to calculate a final hash value 250.

Signature data 270 is generated by applying the secret key 251 of the encrypted content signature (ECS) issuing device 102 to the final hash value 250.

This signature data 270 is stored as ECS issuing device signature 203 that is the configuration data of the encrypted content signature file (ECS file) 200 illustrated in FIG. 11.

Note that, as illustrated in FIG. 12, the hash value generation processing according to the SHA-1 is performed by sequentially inputting data D1 through Dn obtained by dividing data made up of the content hash list group, or the content hash list group and title key (hash).

Accordingly, in the event that there is no modification in a content, there is also no modification in the content hash list group, and the intermediate hash value to be generated based on these divided data becomes the same value.

Accordingly, for example, in the event of modifying the title key alone, the intermediate hash value calculated based on the content hash list group is held in memory, whereby the final hash value can be calculated by the hash value calculation processing using this intermediate data and the modified title key alone. According to such processing, reduction of the generated load of the signature data can be realized.

6. Content Playing Processing at User Device

Next, the content playing processing sequence at the user device will be described with reference to the flowcharts illustrated in FIGS. 13 and 14.

Figure 13:
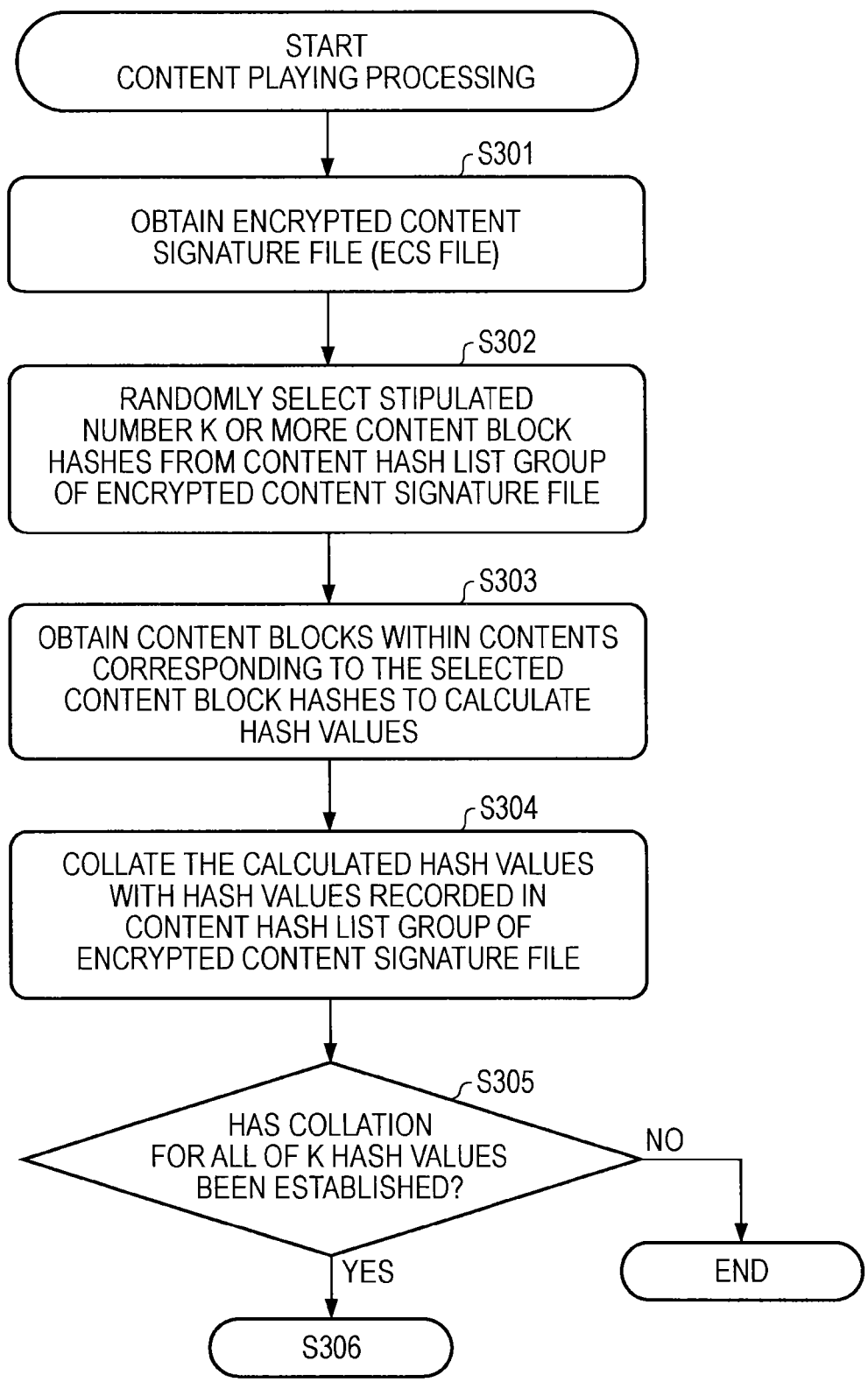
FIG. 13 is a diagram illustrating a flowchart for describing a content playing processing sequence at a user device.
Figure 14:
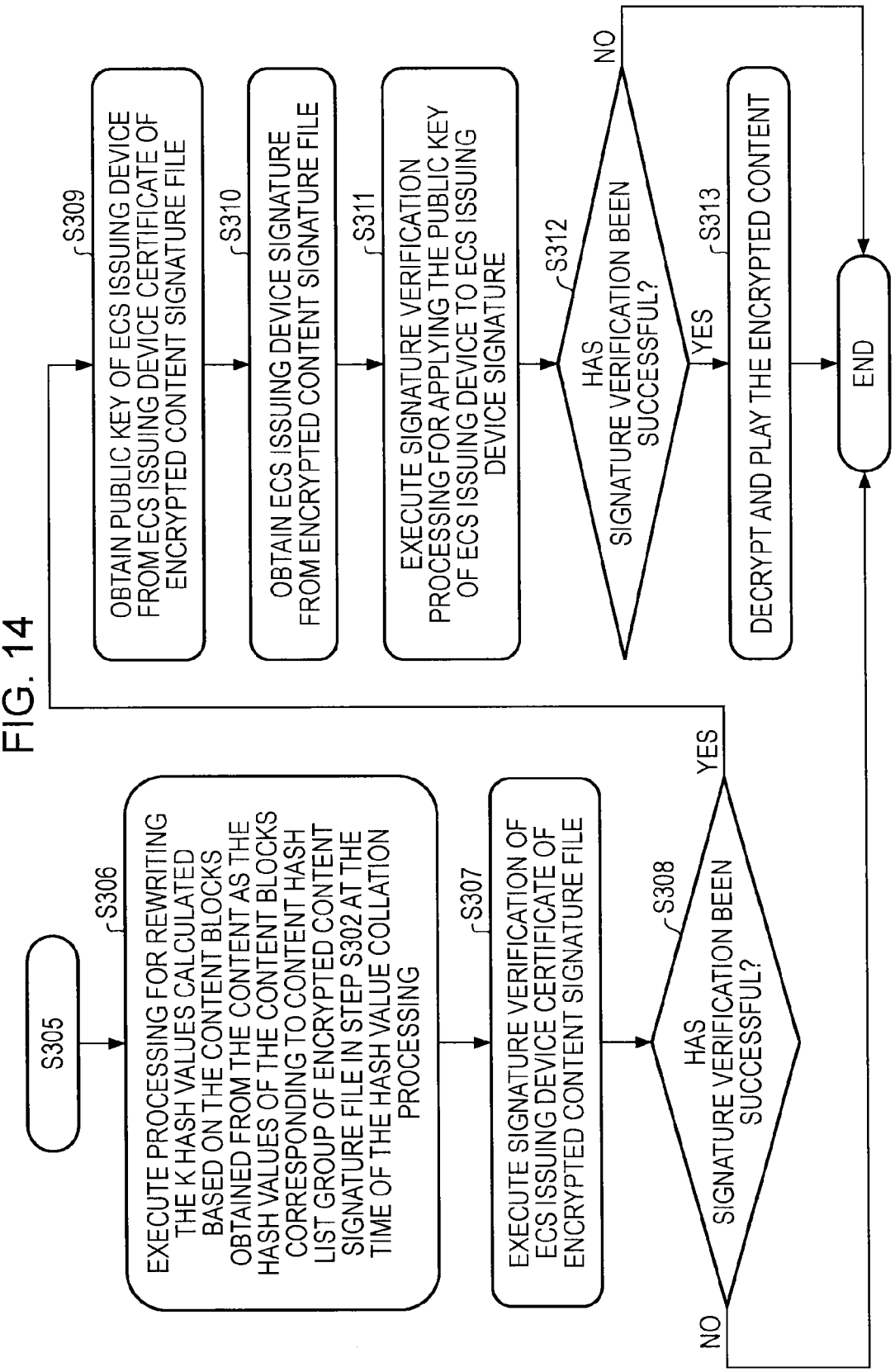
FIG. 14 is a diagram illustrating a flowchart for describing the content playing processing sequence at a user device.

The flowcharts illustrated in FIGS. 13 and 14 are flowcharts for describing the details of the processing in processing steps S132 through S135 that the user device 104 in the sequence chart previously described with reference to FIG. 4 executes.

Let us say that the user device has received the following data from the content providing device 103.

(1) Encrypted content
(2) Title key serving as secret key to be applied to decryption of encrypted content
(3) Encrypted content signature file (ECS file)

Let us say that these received data is recorded in a medium such as a hard disk, flash memory, or the like of the user device, for example. Note that in the event that the content providing device provides the above each data to the user device by storing in a medium, for example, such as DVD, BD, or the like, all of the data readout is performed from this medium.

First, in step S301 in the flow illustrated in FIG. 13, the user device reads out the encrypted content signature file (ECS file) from a hard disk, flash memory, or a medium, such as DVD, BD, or the like, for example.

Next, in step S302, the user device randomly selects a predetermined number (k: e.g., k=7) or more of content block hashes from the content hash list group recorded in the encrypted content signature file (ECS file).

Further, in step S303, the user device obtains a content block within the content corresponding to the selected content block to calculate a hash value.

Note that the position of the content block may also be obtained based on the attribute information (offset/length) within the hash list.

Also, in the case of ECS type=1, the user device executes decryption as to the content block before hash value calculation, and performs hash value calculation. In this case, only decryption as to the selected content block for the hash value matching processing is permitted.

Next, in step S304, the user device executes matching processing between the calculated hash value calculated in step S303, and the hash value selected from the content hash list group of the encrypted content signature file (ECS file) in step S302.

In step S305, the user device determines hash value matching results. In the case that the matchings for the k number or more of hash values selected in step S302 have all been achieved (the calculated hash values=the hash values obtained from the content hash list group), determination in step S305 becomes matching achievement (=Yes), and the user device proceeds to step S306.

On the other hand, in the case that even one of the matchings for the k number or more of hash values selected in step S302 has not been achieved (the calculated hash values≠the hash values obtained from the content hash list group), determination in step S305 matching unachieved (=No), and the processing is ended. In this case, the playing processing of the content is not executed.

In the case that the matchings for the k number or more of hash values selected in step S302 have all been achieved (the calculated hash values=the hash values obtained from the content hash list group), the user device proceeds to step S306, and performs processing for replacing the hash values of the content hash list group recorded in the encrypted content signature file (ECS file).

Specifically, at the time of the hash value matching processing, in step S302, the user device executes processing for replacing the k hash values calculated based on the content block obtained from the content as the hash values of the content block corresponding to the content hash list group in the encrypted content signature file.

A specific example of the processing in step S306 will be described with reference to FIG. 15.

Figure 15:
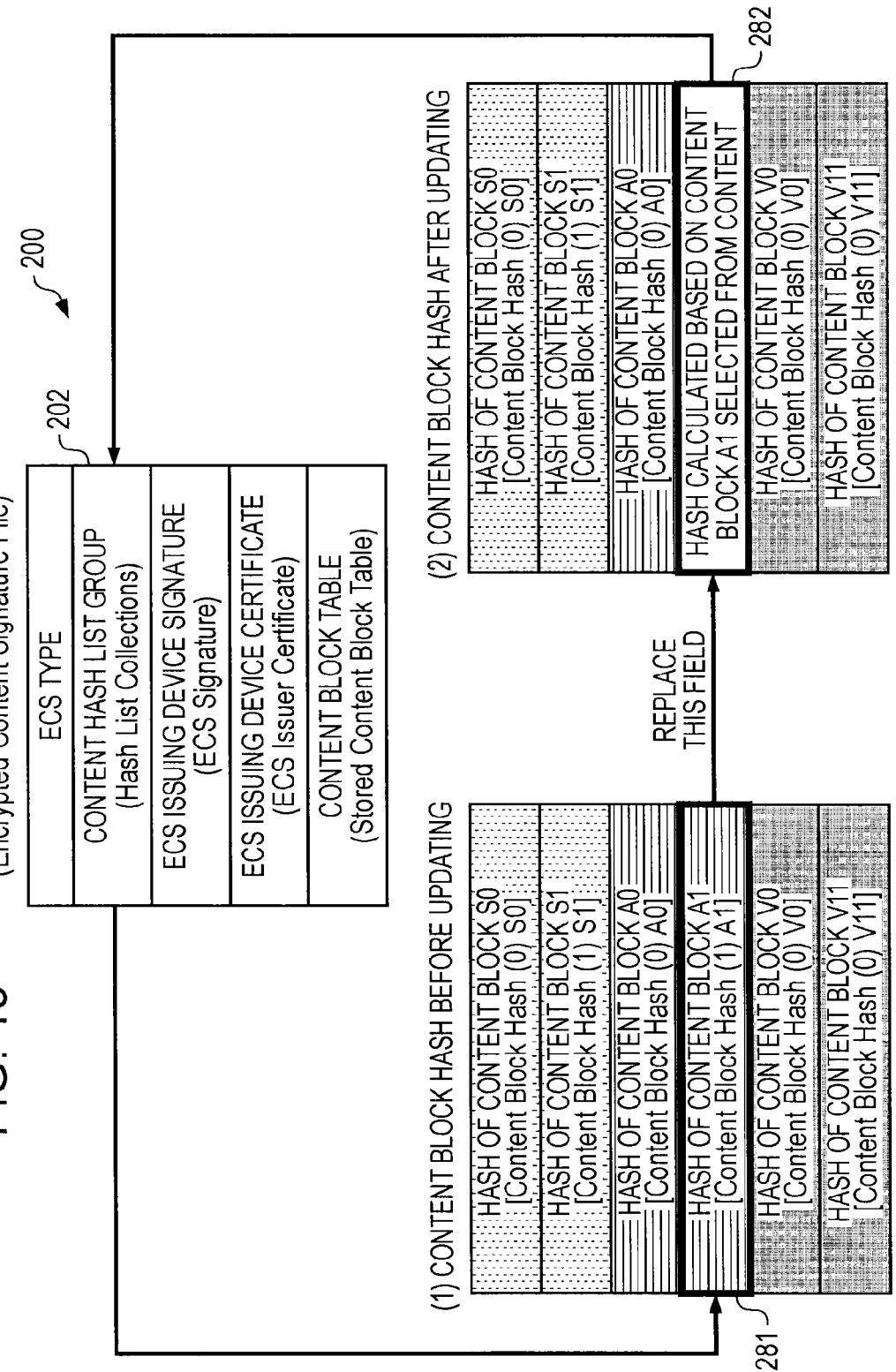
FIG. 15 is a diagram for describing replacement processing of a hash value of a content hash list group of an encrypted content signature file.

"Hash of content block A1" 281 indicated in FIG. 15 is a hash value selected from the content hash list group 202 of the encrypted content signature file 200 of which the hash value matching processing has been executed.

The user device performs processing for replacing this "hash of content block A1" 281 with the calculated hash value of which the matching processing with "hash of content block A1" 281 has been executed, i.e., with the hash value 282 calculated based on the content block of the content.

Note that the user device performs processing for replacing the k or more hash values subjected to matching processing selected in step S302 with the calculated hash values.

Next, in step S307, the user device reads out an ECS issuing device certificate recorded in the encrypted content signature file (ECS file) to execute verification processing of a signature stored in the ECS issuing device certificate. This signature is a signature generated by the secret key of the license issuing device 101, and the user device executes signature verification by applying the public key of the license issuing device 101.

Upon signature verification being determined to be successful in step S308, the user device proceeds to step S309.

Upon signature verification being determined to have failed, the processing is ended. In this case, content playback is not performed.

Upon signature verification being determined to be successful in step S308, the user device proceeds to step S309, and obtains the public key of the ECS issuing device recorded in the ECS issuing device certificate recorded in the encrypted content signature file (ECS file).

As described above, the ECS issuing device certificate is a public key certificate in which the public key of the ECS issuing device is stored, and the user device obtains the public key of the ECS issuing device from here.

Next, in step S310, the user device obtains the ECS issuing device signature recorded in the encrypted content signature file (ECS file).

The ECS issuing device signature becomes, as previously described with reference to FIG. 11, different signature data according to the value of the ECS type, i.e., becomes the following settings.

(ECS type=0)

This is a case where the content hash list group is a content hash list group in which a hash value generated based on the configuration data (content block) of an encrypted content is stored, where signature data generated with the content hash list group alone being taken as signature object data is stored.

(ECS type=1)

This is a case where the content hash list group is a content hash list group in which a hash value generated based on the configuration data (content block) of a plain text content is stored, where signature data generated with the content hash list group and title key (hash) being taken as signature object data is stored.

Note that a hash value and attribute information (offset, length) for a content block by data type (audio/subtitle/video) are recorded in the content hash list group.

Next, in step S311, the user device executes signature verification processing to which the public key of the ECS issuing device obtained in step S309 has been applied, on the ECS issuing device signature read out from the encrypted content signature file (ECS file).

The signature verification processing is performed in accordance with the following processing according to the ECS type, for example.

(ECS type=0)

This is a case where the content hash list group is a content hash list group in which a hash value generated based on the configuration data (content block) of an encrypted content is stored.

In this case, in step S306, the user device executes matching between the calculation results where the public key (ECS Issuer Public Key) of the ECS issuing device obtained in step S309 has been applied to the content hash list group (Hash List Collections) subjected to the hash value replacement processing, and the ECS issuing device signature (ECS Signature) read out from the encrypted content signature file (ECS file).

The verification processing can be represented with an equation as follows.

ECDSA_Verify (ECS Issuer Public Key, ECS Signature, Hash List Collections)

(ECS type=1)

This is a case where the content hash list group is a content hash list group in which a hash value generated based on the configuration data (content block) of a plain text content is stored.

In this case, in step S306, the user device executes matching between the calculation results where the public key (ECS Issuer Public Key) of the ECS issuing device obtained in step S309 has been applied to the connection data between the content hash list group (Hash List Collections) subjected to the hash value replacement processing and the title key hash value (SHA (Title Key)), and the ECS issuing device signature (ECS Signature) read out from the encrypted content signature file (ECS file).

The verification processing can be represented with an equation as follows.

ECDSA_Verify (ECS Issuer Public Key, ECS Signature, Hash List Collections∥SHA (Title Key))

In the case that determination is made in step S312 that the signature verification has been achieved, the user device determines that the original data for generation of the signature data has not been subjected to tampering, and proceeds to step S313, executes decryption processing to which the title key has been applied, on the encrypted content, and playing processing and use processing of the decrypted content is executed.

On the other hand, in the case that determination is made in step S312 that the signature verification has not been achieved, determination in step S312 becomes No, and the processing is ended. In this case, playing processing and use processing of the decrypted content is not executed.

Note that a playing processing program in accordance with the sequences illustrated in FIGS. 13 and 14 for executing decryption and playback of a content under the condition of hash value matching and the signature verification of the encrypted content signature file (ECS file) is stored in the user device (content playing device) 104, and the processes, such as the hash value matching process, the signature verification of the encrypted content signature file (ECS file), content playback, and so forth, are executed in accordance with this playing processing program.

In this way, with an arrangement of the present disclosure, (1) Content, and (2) Title Key Serving as Encryption Key to Be Applied to Encryption and Decryption Processing of Content, signature verification is executed on the signature generated based on these data.

Only in the case that the content and title key, a combination of these two types of data has been confirmed to be a correct combination by this verification processing, playback and use of the content is permitted at the user device.

Accordingly, in the case of an unauthorized content and title key combination data different from the original content and title key combination, the signature verification is not achieved, and such unauthorized content use is prevented.

7. Details of Format of Encrypted Content Signature File (ECS File)

Next, the details of the format of the encrypted content signature file (ECS file) will be described with reference to FIG. 16 and thereafter.

7-1. Entire Configuration of Encrypted Content Signature File (ECS File)

As described with reference to FIGS. 2 and 11, the encrypted content signature file (ECS file) 200 is a file including the following data.

(1) ECS type 201

(2) Content Hash List Group (Hash List Collections) 202

(3) ECS Issuing Device Signature (ECS Signature) 203

(4) ECS Issuing Device Certificate (ECS Issuer Certificate) 204

(5) Content Block Table (Stored Content Block Table) 205

The details of these data included in the encrypted content signature file (ECS file) 200, and further the other data will be described with reference to FIG. 16 and thereafter.

Figure 16:
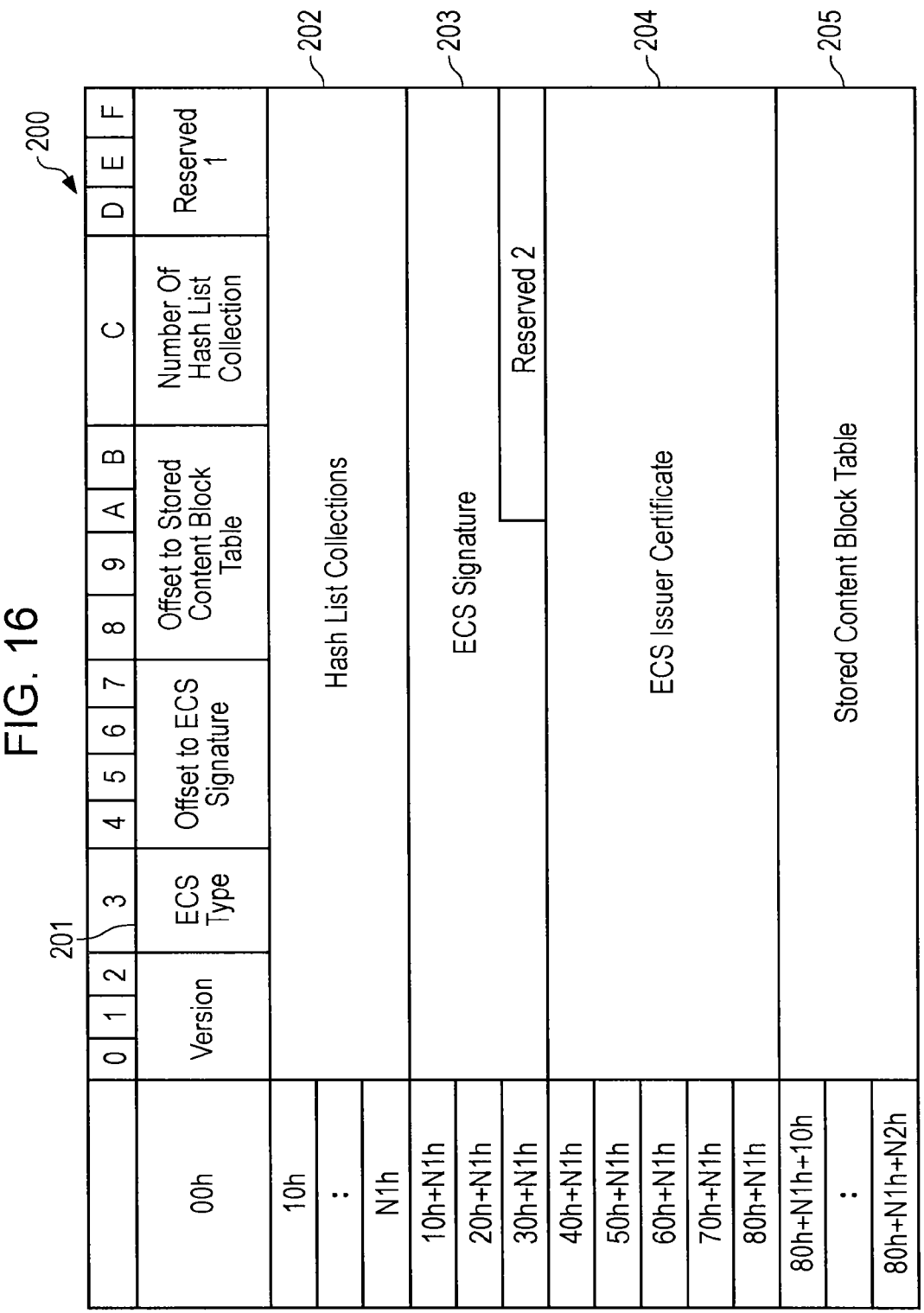
FIG. 16 is a diagram for describing the details of the format of the encrypted content signature file (ECS file)

FIG. 16 is a format diagram illustrating an example of the format of the encrypted content signature file (ECS file) 200. The encrypted content signature file (ECS file) 200 illustrated in FIG. 16 includes the same configuration data as described with reference to FIGS. 2 and 11, i.e., the following data.

(1) ECS type 201

(2) Content Hash List Group (Hash List Collections) 202

(3) ECS Issuing Device Signature (ECS Signature) 203

(4) ECS Issuing Device Certificate (ECS Issuer Certificate) 204

(5) Content Block Table (Stored Content Block Table) 205

Note that, with the format diagrams in FIG. 16 and thereafter, reserved fields are fields of which all of the bits are embedded with 0. Each data of the format illustrated in FIG. 16 will now be described.

Version

This is a filed where the version of the encrypted content signature file (ECS file) 200 is described.

ECS Type

This is ECS type 201 described with reference to FIGS. 2 and 11, where a flag indicating the type of the signature object data is described. Specifically, either of the following two types is recorded.

ECS type=0: a hash value calculated from an encrypted content is stored in the subsequent content hash list group (Hash List Collections) 202 field.

ECS type=1: a hash value calculated from an unencrypted plain text content is stored in the subsequent content hash list group (Hash List Collections) 202 field.

Note that a hash value generated with content blocks set by data type making up a content being taken as increments as described above is recorded in the content hash list group (Hash List Collections) 202.

ECS Signature Offset (Offset to ECS Signature)

With the present field, the number of bytes (offset) from the head of the file to the ECS issuing device signature (ECS Signature) 203 field are recorded.

Content Block Table Offset (Offset to Stored Content Block Table)

With the present field, the number of bytes (offset) from the file head to the content block table (Stored Content Block Table) are recorded.

Number of Content Hash List Groups (Number of Hash List Collection)

With the present field, a total number of the content hash list groups included in the content hash list group (Hash List Collections) 202 recorded in the present file is described.

Content Hash List Group (Hash List Collections) 202

The content hash list group (Hash List Collections) 202 is, as described above, the data (=the content hash list group (Hash List Collections) 183 indicated in FIGS. 2 and 11) generated by the content providing device (Content Server) 103, and is, as described above, the data including a hash value generated based on the configuration data of a content to be provided to the user device, and specifically a content generated based on a content, for example, such as a movie or the like to be played at the user device, and attribute information thereof.

ECS Issuing Device Signature (ECS Signature) 203

The ECS issuing device signature (ECS Signature) 203 becomes different signature data according to the value of the ECS type. Specifically, the following settings are made.
(ECS type=0)

This is a case where the content hash list group 202 is a content hash list group in which a hash value generated based on the configuration data (content block) of an encrypted content is stored, where signature data generated with the content hash list group alone being taken as signature object data is stored.
(ECS type=1)

This is a case where the content hash list group 202 is a content hash list group in which a hash value generated based on the configuration data (content block) of a plain text content is stored, where signature data generated with the content hash list group and title key (hash) being taken as signature object data is stored.

For example, ECDSA electronic signature is described here.

ECS Issuing Device Certificate (ECS Issuer Certificate) 204

The ECS issuing device certificate (ECS Issuer Certificate) 204 is a public key certificate corresponding to the ECS issuing device 102, where the public key of the ECS issuing device 102 is stored.

Content Block Table (Stored Content Block Table) 205

In the case that a hash list corresponding to multiple contents is recorded in the above content hash list group (Hash List Collections) 202, the content block table (Stored Content Block Table) 205 is set as a field where correspondence information between each hash list and a content is recorded.

Next, in increments of the configuration data of the encrypted content signature file (ECS file) 200 indicated in FIG. 16, further the details thereof will be described.

7-2. Details of ECS Issuing Device Certificate (ECS Issuer Certificate)

Figure 17:
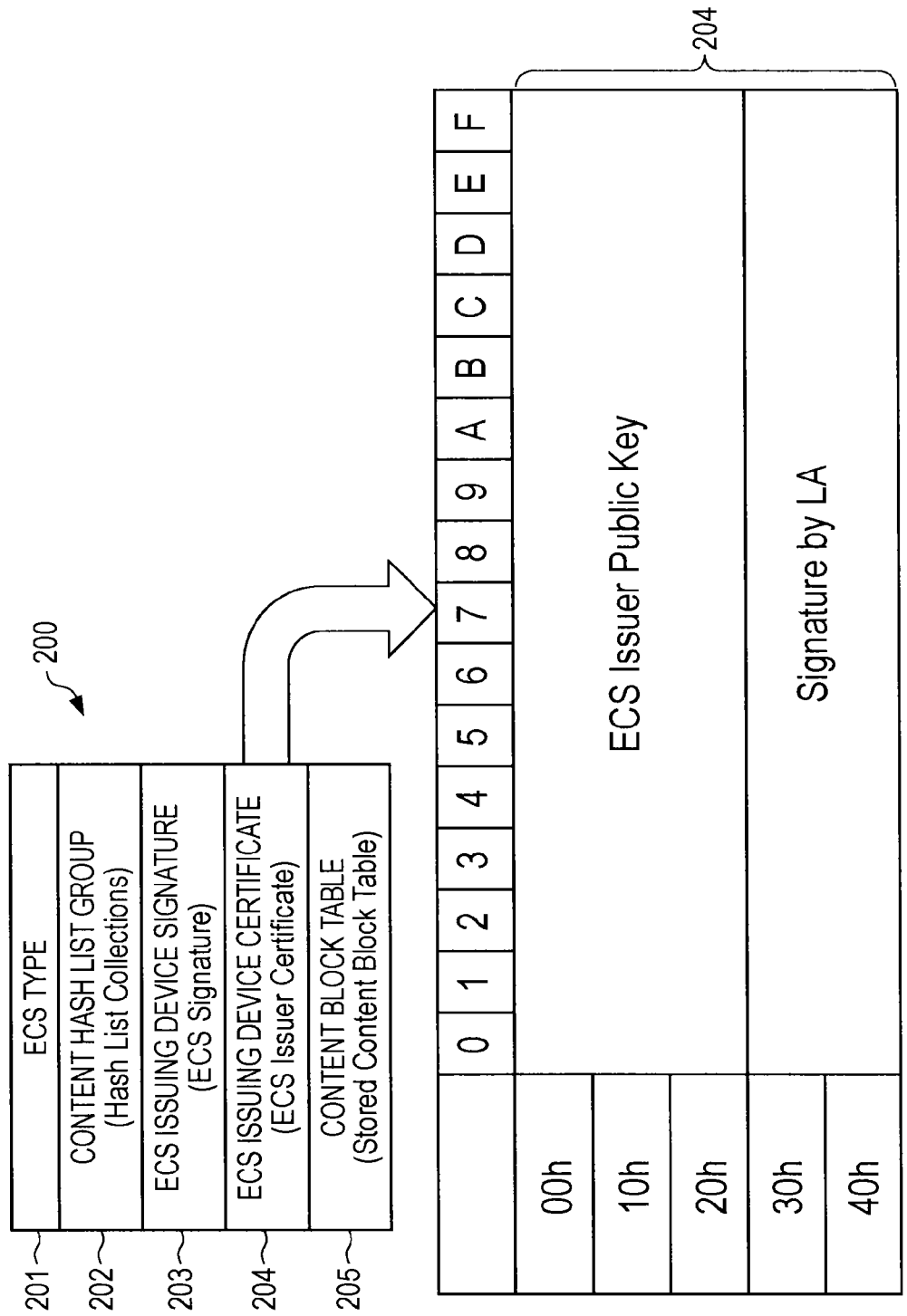
FIG. 17 is a diagram for describing the details of the format of the encrypted content signature file (ECS file)

The details of the ECS issuing device certificate (ECS Issuer Certificate) 204 that is one piece of the configuration data of the encrypted content signature file (ECS file) 200 will be described with reference to FIG. 17.

ECS Issuing Device Public Key (ECS Issuer Public Key)

With the present field, the public key of the ECS issuing device (ECS Issuer) is recorded.

License Issuing Device (LA) Signature (Signature by LA)

With the present field, signature data generated by applying the secret key of the license issuing device (LA) to the public key of the ECS issuing device (ECS Issuer) is stored.

In the event of taking out and using the ECS issuing device public key (ECS Issuer Public Key) from the ECS issuing device certificate (ECS Issuer Certificate) 204, the user device first performs signature verification of the license issuing device (LA) signature (Signature by LA), and according to achievement of signature verification, confirmation is made that the ECS issuing device certificate (ECS Issuer Certificate) 204 is an authorized certificate without tampering. After this confirmation, the user device takes out and uses the ECS issuing device public key (ECS Issuer Public Key).

7-3. Details of Content Hash List Group (Hash List Collections)

Next, the details of the content hash list group (Hash List Collections) 202 that is one piece of the configuration data of the encrypted content signature file (ECS file) 200 will be described with reference to FIG. 18.

Figure 18:
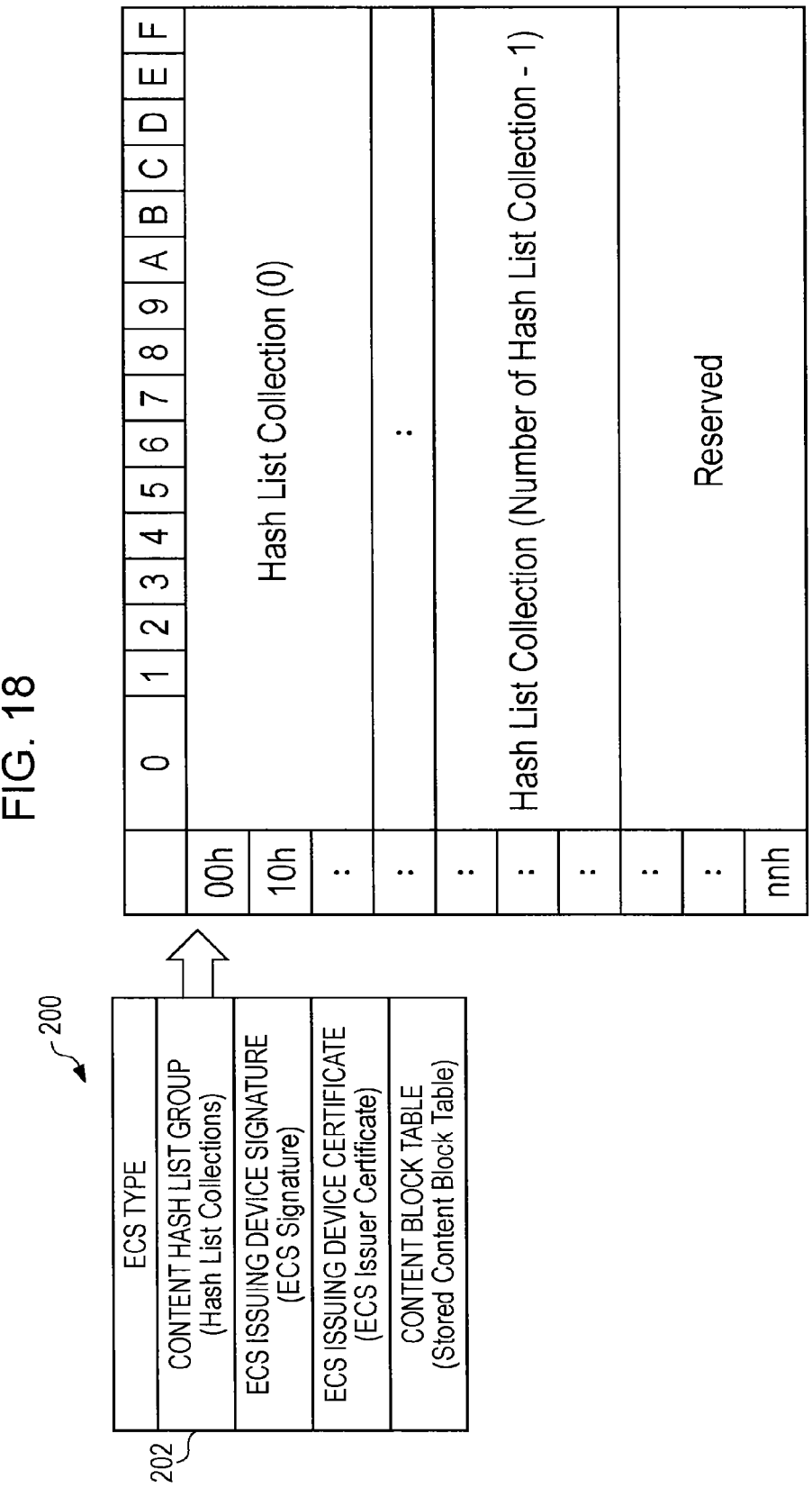
FIG. 18 is a diagram for describing the details of the format of the encrypted content signature file (ECS file)

As illustrated in FIG. 18, multiple hash list groups (Hash List Collections) are recorded in the content hash list group (Hash List Collections) 202, and each of these corresponds to (C) Hash List Group by Data Type indicated in FIG. 10, i.e., data made up of a hash value of a content block set by data type such as audio data, subtitle data, video data, and so forth, and attribute information (offset, length).

FIG. 19 illustrates the detailed format of one hash list group (Hash List Collection) of multiple hash list groups (Hash List Collections) included in the content hash list group (Hash List Collections) 202 indicated in FIG. 18. Description will be made regarding the configuration data of one hash list group (Hash List Collection) indicated in FIG. 19.

Hash List Group Tag (Hash List Collection Tag)

With the present field, the identifier of data making up a hash list group (Hash List Collection) is described. As for the identifier, in the event that the content is a mp4 file, [track ID] or the like is described.

Number of Hash Lists

With the present field, a total number of the subsequent hash lists is described.

Hash List

With the present field, a hash list made up of a hash value in increments of content blocks by data type (audio/subtitle/video) and attribute information and so forth is described. The number of hash list fields according to the number of content blocks where a hash value has been generated are set.

Further, the detailed configuration of one hash list (Hash List) field will be described with reference to FIG. 20.

FIG. 20 illustrates (1) Hash list (Hash List) in the case of a content without variation, and (2) Hash list (Hash List) in the case of a content with a variation.

A content with a variation is, as previously described with reference to FIG. 9, a content a part of which multiple videos or the like that the user can select are set, for example, such as a multi-angle content or the like.

In the case of a content with a variation, each variation data, and specifically, a hash value corresponding to each of content blocks V11, V12, and V13 of the video illustrated in FIG. 9 is stored within the hash list.

As data common to both of, indicated in FIG. 20, (1) Hash list (Hash List) in the case of a content without variation, and (2) Hash list (Hash List) in the case of a content with a variation, the following data is stored.

Hash Type

With the present field, a flag indicating a hash calculating method is described. For example, the following flags are stored.

Hash type=0: with the subsequent content block hash (Content Block Hash) field, a hash value calculated from an encrypted content is stored.

Hash type=1: with the subsequent content block hash (Content Block Hash) field, a hash value calculated from an unencrypted plain text content is stored.

Note that in the event that the setting of the ECS type 201 of the encrypted content signature file (ECS file) 200 previously described with reference to FIG. 2 is "1", the hash type (Hash Type) is set to "1".

Content Block Offset

With the present field, the offset position from the content file head of a content block (Content Block) that is the configuration data of a content where a hash value has been calculated is described in increments of bytes.

Content Block Length

With the present field, the data length of a content block (Content Block) that is the configuration data of a content where a hash value has been calculated is described in increments of bytes.

Number of Content Block Hashes

With the present field, a total number of hashes recorded in the subsequent content block hash (Content Block Hash) is described.

Content Block Hash

With the present field, a hash value calculated from each content block (Content Block) is described. Note that calculation of a content block hash (Content Block Hash) is executed in accordance with the following equation.

$$\text{Content Block Hash} = [\text{SHA}(\text{Content Block})]_{lsb\_64}$$

Note that as described above, in the case that the ECS type (ECS Type) or hash type (Hash Type) is 0, a content block (Content Block) for hash value calculation is extracted from a content encrypted by the title key.

On the other hand, in the case that the ECS type (ECS Type) or hash type (Hash Type) is 1, a content block (Content Block) for hash value calculation is extracted is extracted from an unencrypted plain text content.

As illustrated in FIG. 20, (1) In the case of a hash list (Hash List) at the time of a content without variation, one hash value corresponding to one content block is recorded.

On the other hand, (2) In the case of a hash list (Hash List) at the time of a content with a variation, multiple hash values corresponding to multiple content blocks according to the number of variations are recorded.

7-4. Details of Content Block Table (Stored Content Block Table)

Next, the details of the content block table (Stored Content Block Table) 205 that is one piece of the configuration data of the encrypted content signature file (ECS file) 200 will be described with reference to FIG. 21.

In the event that a hash list corresponding to multiple contents is recorded in the content hash list group (Hash List Collections) 202 that is one piece of the configuration data of the encrypted content signature file (ECS file) 200 as described above, the content block table (Stored Content Block Table) 205 is set as a field where correspondence information (index) for determining the hash list corresponding to the content actually provided to the user device, for example, has been recorded.

Specifically, information for identifying which hash list corresponds to a user available content is recorded in the content block table (Stored Content Block Table) 205.

A specific data configuration is illustrated in FIG. 21.

Number of Content Block Indexes (Number of Stored Content Block Index)

With the present field, a total number of the subsequent content block indexes (Stored Content Block Index) is described. However, in the case that there is no content block variation (Content Block Variation), 0 is set.

Content Block Index (Stored Content Block Index)

With the present field, correspondence information (index) between each hash list and a content is recorded.

Specifically, this field is a field for storing index information indicating a correspondence relation between multiple content block hashes (Content Block Hash) registered in a hash list (Hash List) and a content (Content).

Figure 22:
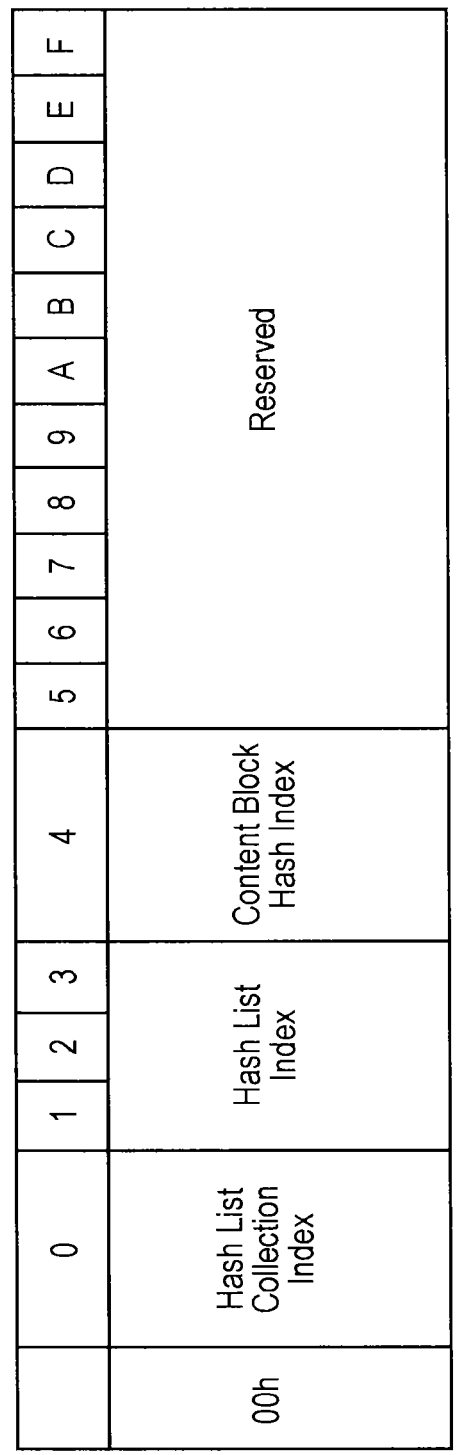
FIG. 22 is a diagram for describing the details of the format of the encrypted content signature file (ECS file)

The detailed format of one content block index (Stored Content Block Index) is illustrated in FIG. 22. Description will be made regarding each configuration data of the detailed format of the content block index (Stored Content Block Index) illustrated in FIG. 22.

Hash List Group Index (Hash List Collection Index)

With the present field, the index (identifier) of a hash list group (Hash List Collection) is described.

Hash List Index

With the present field, the index (identifier) of a hash list (Hash List) is described.

Content Block Hash Index

With the present field, the index (identifier) of a content block hash (Content Block Hash) is described.

A specific example of the content block table (Stored Content Block Table) 205 will be described with reference to FIG. 23.

Figure 23:
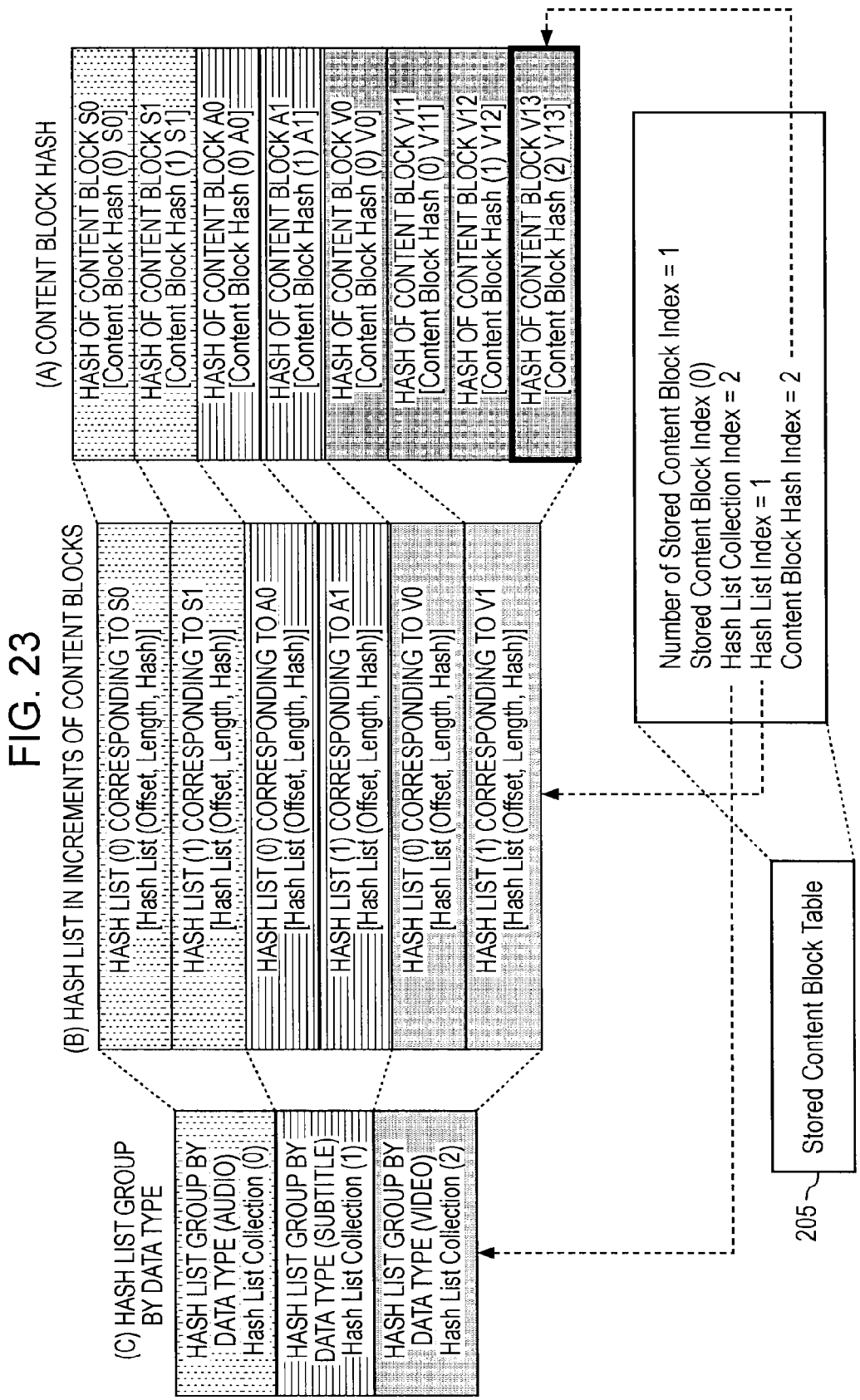
FIG. 23 is a diagram for describing a specific example of a content block table of the encrypted content signature file (ECS file)

The example illustrated in FIG. 23 illustrates a specific example of the content block table (Stored Content Block Table) 205 corresponding to a content with a variation having video blocks V11, V12, and V13 made up of three variations previously described with reference to FIG. 9.

With this example, hashes corresponding to the three variations V11, V12, and V13 are recorded in the content hash list group 202 stored in the encrypted content signature file (ECS file). However, let us say that an actual user available content is a content corresponding to the variation V13.

With the content block table (Stored Content Block Table) 205 in this case, the following data is recorded as illustrated in FIG. 23.

Number of content block indexes (Number of Stored Content Block Index)=1

Content block index (Stored Content Block Index) (0)

Hash list group index (Hash List Collection Index)=2

Hash list index (Hash List Index)=1

Content block hash index (Content Block Hash Index)=2

For example, the last,

Content block hash index (Content Block Hash Index)=2, this data indicates the content block hash of user available variation data, and this case indicates that the hash (2) of the lowest content block V13 of (A) Content Block Hash in FIG. 23 is available.

Also,

Hash list index (Hash List Index)=1 this data indicates a hash list in increments of content blocks stored in the content block hash of user available variation data, and this case indicates that the lowest hash list (1) of the (B) hash lists in increments of content blocks in FIG. 23 is available.

Also,

Hash list group index (Hash List Collection Index)=2 this data indicates a hash list group by data type stored in the content block hash of user available variation data, and this indicates that the lowest hash list group (2) of (A) the hash list group by data type in FIG. 23 is available.

Even in the event that multiple hash values corresponding to a content block corresponding to multiple variations are stored in the encrypted content signature file (ECS file), a hash value corresponding to a content block according to a variation that the user uses can be selected from these data.

Note that a hash list in the case that multiple hash values corresponding to a content block corresponding to multiple variations are stored in the encrypted content signature file (ECS file) is a hash list described with reference to (2) in FIG. 20, for example.

8. Hardware Configuration Example of Each Device

Finally, a hardware configuration example of each device which executes the above processing will be described with reference to FIG. 24.

Figure 24:
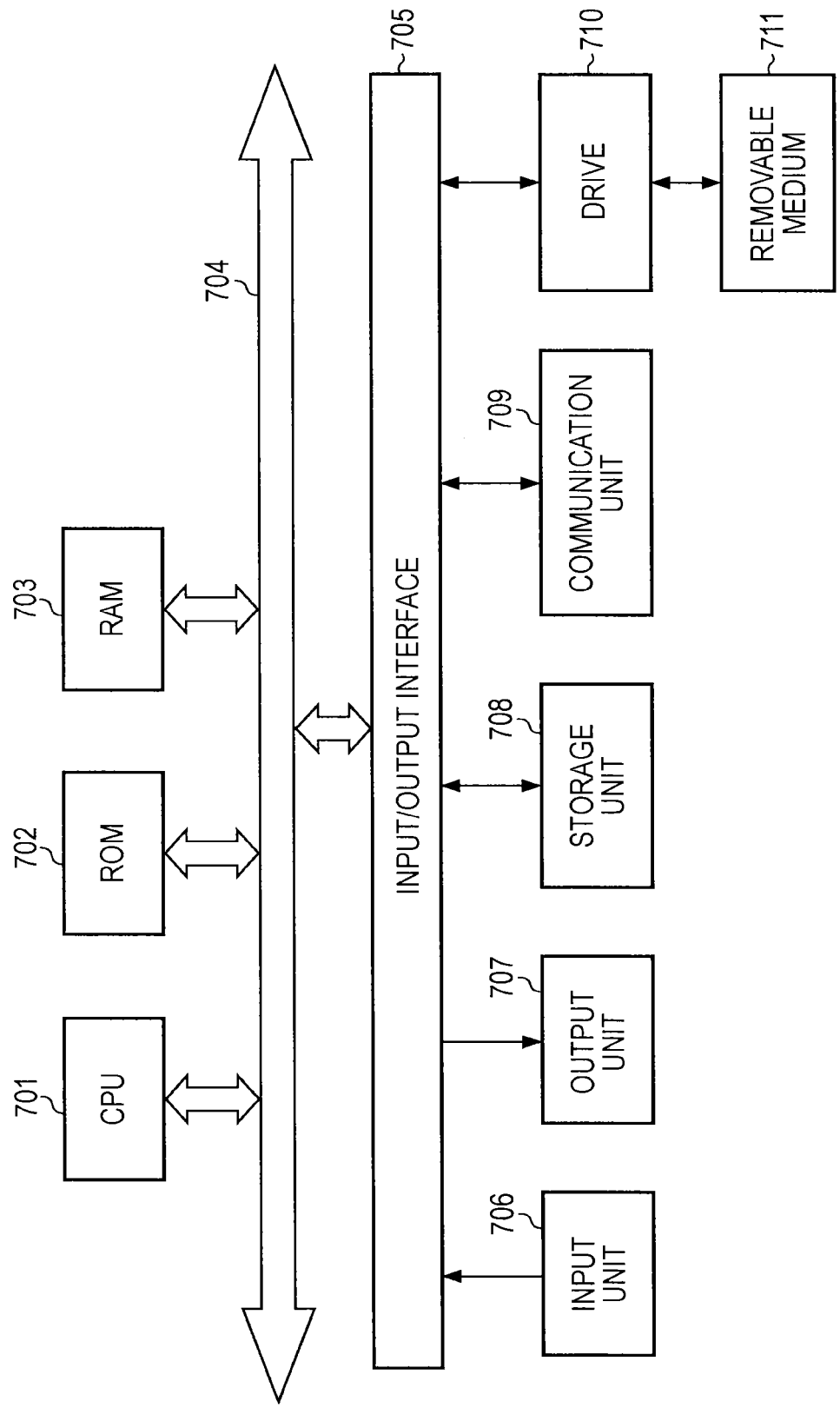
FIG. 24 is a diagram for describing a hardware configuration example of an information processing device.

FIG. 24 illustrates a hardware configuration example of an information processing device which can be applied to any of the user devices 104, content providing devices 103, encrypted content signature issuing device 102, and license issuing device 101.

A CPU (Central Processing Unit) 701 serves as a data processing section for executing various types of processing in accordance with a program stored in ROM (Read Only Memory) 702 or a storage unit 708. For example, the CPU 701 executes processing in accordance with the above each flowchart. A program that the CPU 701 executes, data, or the like is stored in RAM (Random Access Memory) 703 as appropriate. These CPU 701, ROM 702, and RAM 703 are mutually connected by a bus 704.

The CPU 701 is connected to an input/output interface 705 via the bus 704, and an input unit 706 made up of various types of switches, keyboard, mouse, microphone, and so forth, and an output unit 707 made up of a display, speakers, and so forth are connected to the input/output interface 705. The CPU 701 executes various types of processing corresponding to a command input from the input unit 706, and outputs the processing result to, for example, the output unit 707.

The storage unit 708 connected to the input/output interface 705 is made up of, for example, a hard disk or the like, and stores a program that the CPU 701 executes, and various types of data. A communication unit 709 communicates with an external device via a network such as the Internet or local area network, or the like.

A drive 710 connected to the input/output interface 705 activates a removable medium 711 such as a magnetic disk, optical disc, magneto-optical disk, or semiconductor memory such as a memory card or the like to obtain various types of data such as recorded content, key information, and so forth. For example, content decryption/playing processing or the like is performed using the obtained content and key data in accordance with the playing program that the CPU executes.

9. Arrangement of Present Disclosure

Embodiments of the present disclosure have been described in detail with reference to particular embodiments. However, it is clearly evident that one skilled in the art can conceive various modifications or alternations without departing from the essence of the present disclosure. That is to say, the present disclosure has been described in an exemplary form, which is not to be interpreted in a limited manner. The claims should be referred to in order to determine the essence of the present disclosure.

Note that the technology disclosed in the present Specification may have the following arrangements.

(1) An information processing device including:
 a data processing unit configured to execute decryption and playing processing of an encrypted content, wherein the data processing unit executes content playback propriety determination processing by applying an encrypted content signature file set in response to a content to be played;
  and wherein the encrypted content signature file includes
   a content hash list group including a hash value based on the configuration data of a content, and
   signature data as to data generated from a content encryption key and the content hash list group;
  and wherein the data processing unit executes, with the content playback propriety determination processing,
   hash value matching processing between a hash value calculated from the configuration data of a content to be played, and a hash value for matching included in the content hash list group, and
   signature verification processing to which the signature data has been applied to perform decryption and playing processing of the encrypted content under the condition that both of the hash value matching processing and the signature verification processing have been successful.

(2) An information processing system including:
 a user device configured to execute content playing processing;
 a content providing device configured to execute content providing processing as to the user device; and
 an encrypted content signature issuing device configured to execute encrypted content signature file providing processing as to the content providing device;
  wherein the content providing device transmits to the encrypted content signature issuing device a content hash list group including a hash value based on the configuration data of a content, and a content encryption key or the hash value of an encryption key;
  and wherein the encrypted content signature issuing device generates signature data with the content hash list group and the hash value of a content encryption key as a signature object, and generates an encrypted content signature file including the generated signature data, and the content hash list group to transmit to the content providing device;
  and wherein the content providing device provides an encrypted content and the encrypted content signature file to a user device;
  and wherein the user device executes hash value matching processing between a hash value calculated from the configuration data of a content to be played, a hash value for matching included in a content hash list group within an encrypted content signature file, and signature verification processing to which signature data within the encrypted content signature file has been applied, and performs decryption and playing processing of the encrypted content under the condition that both of the hash value matching processing and the signature verification processing have been successful.

(3) An information processing device including:

a data processing unit configured to generate the configuration data of an encrypted content signature file to be applied to content playback propriety determination processing, wherein the data processing unit calculates a hash value in increments of content blocks by data type making up a content, generates a hash list including the calculated hash value, and attribute information including the position information of a content block serving as a hash value calculation object, generates a content hash list group collected from a plurality of the hash lists, transmits the generated content hash list group, and a content encryption key or the hash value of this encryption key to an external signature issuing device, obtains, from the signature issuing device, an encrypted content signature file including the content hash list group, and signature data as to generated data based on a content encryption key and the content hash list group, and provides the obtained encrypted content signature file and encrypted content to a user device.

(4) The information processing device or information processing system according to any of (1) through (3), wherein a hash value stored in the content hash list group is a hash value generated based on the configuration data of a plain text content not subjected to encryption.

(5) The information processing device or information processing system according to any of (1) through (4), wherein a hash value stored in the content hash list group is a hash value in increments of content blocks by data type making up a content.

(6) The information processing device or information processing system according to any of (1) through (5), wherein a hash value stored in the content hash list group is a hash value in increments of content blocks by each data of audio, video, and subtitle making up a content.

(7) The information processing device or information processing system according to any of (1) through (6), wherein each content hash list making up the content hash list group is data including a hash value in increments of content blocks by each data of audio, video, and subtitle making up a content, and attribute information indicating the position information of the content block.

(8) The information processing device or information processing system according to any of (1) through (7), wherein a content hash list making up the content hash list group is data including a plurality of hash values corresponding to a plurality of content blocks corresponding to a plurality of different variations of data.

(9) The information processing device according to (8), wherein the plurality of different variations of data are a plurality of video data taken from a plurality of different angles in a multi-angle content.

(10) The information processing device or information processing system according to any of (1) through (9), wherein the data processing unit executes, with the content playback propriety determination processing, hash value replacement processing for replacing a hash value for matching included in the content hash list group with a hash value calculated from the configuration data of a content to be played, and the signature verification processing by applying concatenated data of a content hash list group subjected to the hash value replacement processing, and the hash value of a content encryption key.

Further, a processing method to be executed at the above device and system, and a program causing the device and system to execute processing are also encompassed in the arrangement of the present disclosure.

Also, a series of processing described in the Specification may be executed by hardware or software or a complex arrangement of both. In the case of executing processing according to software, a program in which a processing sequence is recorded may be executed by being installed in memory within a computer embedded in dedicated hardware, or may be executed by being installed in a general-purpose computer capable of various types of processing. For example, the program may be recorded in a recording medium beforehand. In addition to the program being installed in a computer from a recording medium, the program may be received via a network such as a LAN (Local Area Network) or the Internet and installed in a recording medium such as a built-in hard disk or the like.

Note that the various types of processing according to the present Specification include not only processing performed in time sequence in accordance with the described sequence but also include processing not necessarily performed in time sequence but performed in parallel or individually according to the processing capabilities or the like of the device which executes the processing. Also, with the present Specification, the term "system" is a logical group configuration of multiple devices, and is not restricted to a configuration wherein devices serving as the components are not included in the same casing.

The present disclosure contains subject matter related to that disclosed in Japanese Priority Patent Application JP 2011-192498 filed in the Japan Patent Office on Sep. 5, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing device, comprising:
data processing circuitry configured to:
 execute decryption and playing-processing of an encrypted content;
 execute encrypted-content-playback-propriety-determination processing by applying an encrypted-content-signature file set for the encrypted content;
 wherein the encrypted-content-signature file includes:
  a content-hash-list-group including at least one first hash value based on configuration data of the encrypted content, and
  signature data including data generated from a content-encryption-key and from the content-hash-list-group;
 execute, as part of the encrypted-content-playback-propriety-determination processing,
  hash-value-matching processing between at least one second hash value calculated from the configuration data, and the at least one first hash value included in the content-hash-list-group, and
  signature-verification processing of the signature data in the encrypted-content-signature file; and
 permit the decryption and playing-processing only if both of the hash-value-matching processing and the signature-verification processing are successful,
wherein the data processing circuitry is further configured to execute, as part of the encrypted content playback propriety determination processing,
 hash-value-replacement processing for replacing the at least one first hash value included in the content-hash- list-group with at least one second hash value calculated from the configuration data, and signature-verification processing of the signature data in the encrypted content signature file by applying concatenated data of only the content hash list group subjected to the hash value replacement processing, and another hash value of the content-encryption-key.

2. The information processing device according to claim 1, wherein the at least one first hash value in the content-hash-list-group is based on configuration data of plain text content not subjected to encryption.

3. The information processing device according to claim 1, wherein the at least one first hash value in the content-hash-list-group is based on increments of content blocks by content data type.

4. The information processing device according to claim 1, wherein the at least one first hash value in the content-hash-list-group is based on increments of content blocks by content data including audio data, video data, or subtitle data, or a combination thereof.

5. The information processing device according to claim 1, wherein the at least one first hash value in the content-hash-list-group is based on increments of content blocks by content data including audio data, video data, or subtitle data, or a combination thereof, and is based on attribute information indicating position information of the content blocks.

6. The information processing device according to claim 1, wherein the content-hash-list-group includes at least one content-hash-list, the at least one content-hash-list including a plurality of the at least one first hash value corresponding to a plurality of content blocks corresponding to a plurality of different variations of data.

7. The information processing device according to claim 6, wherein the plurality of different variations of data include a plurality of video data taken from a plurality of different angles in a multi-angle content.

8. An information processing system, comprising:
a user device comprising first circuitry configured to execute content-playing-processing of an encrypted content;
a content-providing device comprising second circuitry configured to execute content-providing-processing to the user device; and
an encrypted-content-signature-issuing device comprising third circuitry configured to execute encrypted-content-signature-file-providing-processing to the content-providing device;
wherein the second circuitry of the content-providing device is further configured to:
transmit, to the encrypted-content-signature-issuing device, a content-hash-list-group including at least one first hash value based on the configuration data of the encrypted content, and
a content-encryption-key or at least one second hash value of the content-encryption-key;
wherein the third circuitry of the encrypted-content-signature-issuing device is further configured to:
generate, as a signature object, signature data with the content-hash-list-group and the hash at least one second hash value of the content-encryption-key, and
generate an encrypted-content-signature file including the generated signature data and the content-hash-list-group to transmit to the content-providing device;
wherein the second circuitry of the content-providing device is further configured to provide the encrypted content and the encrypted-content-signature file to the user device; and wherein the first circuitry of the user device is further configured to:
execute hash-value-matching processing between at least one second hash value calculated from the configuration data, and the at least one first hash value included in the content-hash-list-group,
execute signature-verification processing of the signature data in the encrypted-content-signature file,
permit decryption and content-playing-processing if only both of the hash-value-matching processing and the signature-verification processing are successful,
execute hash-value-replacement processing for replacing the at least one first hash value included in the content-hash-list-group with at least one second hash value calculated from the configuration data, and
execute signature-verification processing of the signature data in the encrypted content signature file by applying concatenated data of only the content hash list group subjected to the hash value replacement processing, and another hash value of the content-encryption-key.

9. An information processing device, comprising:
data processing circuitry configured to:
generate configuration data of an encrypted-content-signature file to be applied to content-playback-propriety-determination processing of an encrypted content;
calculate at least one first hash value based on increments of content blocks by data type;
generate at least one content-hash-list including the calculated at least one first hash value, based on attribute information including position information of a content block serving as a hash-value-calculation-object;
generate a content-hash-list-group collected from a plurality of the at least one content-hash-list;
transmit the generated content-hash-list-group and a content-encryption-key or at least one second hash value of the content-encryption-key to an external signature issuing device;
obtain, from the external signature issuing device, an encrypted-content-signature file including the content-hash-list-group, and signature data including data generated based on the content encryption key and from the content-hash-list-group; and
provide the obtained encrypted-content-signature-file and the encrypted content to a user device,
wherein the encrypted content playback propriety determination processing includes:
hash-value-replacement processing for replacing the at least one first hash value included in the content-hash-list-group with at least one second hash value calculated from the configuration data, and
signature-verification processing of the signature data in the encrypted content signature file by applying concatenated data of only the content hash list group subjected to the hash value replacement processing, and another hash value of the content-encryption-key.

10. The information processing device according to claim 9, wherein the at least one first hash value in the content-hash-list-group is based on configuration data of plain text content not subjected to encryption.

11. The information processing device according to claim 9, wherein the at least one first hash value in the content-hash-list-group is based on increments of content blocks by content data type.

12. The information processing device according to claim 9, wherein the at least one first hash value in the content-hashlist-group is based on increments of content blocks by content data including audio data, video data, or subtitle data, or a combination thereof.

13. The information processing device according to claim 9, wherein the at least one first hash value in the content-hash-list-group is based on increments of content blocks by content data including audio data, video data, or subtitle data, or a combination thereof, and is based on attribute information indicating position information of the content blocks.

14. The information processing device according to claim 9, wherein the content-hash-list-group includes at least one content-hash-list, the at least one content-hash-list including a plurality of the at least one first hash value corresponding to a plurality of content blocks corresponding to a plurality of different variations of data.

15. An information processing method executed at an information processing device comprising data processing circuitry configured to execute decryption and playing-processing of an encrypted content, the method comprising:
   executing, using the data processing circuitry, encrypted-content-playback-propriety-determination processing by applying an encrypted-content-signature file set for the encrypted content;
      wherein the encrypted-content-signature file includes:
         a content-hash-list-group including at least one first hash value based on configuration data of the encrypted content, and
         signature data including data generated from a content-encryption-key and from the content-hash-list-group;
   executing, using the data processing circuitry, as part of the encrypted-content-playback-propriety-determination processing,
      hash-value-matching processing between at least one second hash value calculated from the configuration data, and the at least one first hash value included in the content-hash-list-group, and
      signature-verification processing of the signature data in the encrypted-content-signature file;
   permitting, using the data processing circuitry, the decryption and playing-processing only if both of the hash-value-matching processing and the signature-verification processing are successful; and
   executing, using the data processing circuitry, as part of the encrypted content playback propriety determination processing,
      hash-value-replacement processing for replacing the at least one first hash value included in the content-hash-list-group with at least one second hash value calculated from the configuration data, and
      signature-verification processing of the signature data in the encrypted content signature file by applying concatenated data of only the content hash list group subjected to the hash value replacement processing, and another hash value of the content-encryption-key.

16. An information processing method executed at an information processing device comprising data processing circuitry configured to execute content-providing-processing as to a user device, the method comprising:
   generating, using the data processing circuitry, configuration data of an encrypted-content-signature file to be applied to content-playback-propriety-determination processing of an encrypted content at the user device;
   calculating, using the data processing circuitry, at least one first hash value based on increments of content blocks by data type;
   generating, using the data processing circuitry, at least one content-hash-list including the calculated at least one first hash value, based on attribute information including position information of a content block serving as a hash-value-calculation-object;
   generating, using the data processing circuitry, a content-hash-list-group collected from a plurality of the at least one content-hash-list;
   transmitting, using the data processing circuitry, the generated content-hash-list-group and a content-encryption-key or at least one second hash value of the content-encryption-key to an external signature issuing device;
   obtaining, using the data processing circuitry, from the external signature issuing device, an encrypted-content-signature file including the content-hash-list-group, and signature data including data generated based on the content encryption key and from the content-hash-list-group; and
   providing, using the data processing circuitry, the obtained encrypted-content-signature-file and the encrypted content to the user device,
   wherein the encrypted content playback propriety determination processing includes:
      hash-value-replacement processing for replacing the at least one first hash value included in the content-hash-list-group with at least one second hash value calculated from the configuration data, and
      signature-verification processing of the signature data in the encrypted content signature file by applying concatenated data of only the content hash list group subjected to the hash value replacement processing, and another hash value of the content-encryption-key.

17. A non-transitory computer readable storage medium encoded with program instructions, which when executed, causes a computer to execute a method of executing decryption and playing-processing of an encrypted content, comprising:
   executing, using data processing circuitry, encrypted-content-playback-propriety-determination processing by applying an encrypted-content-signature file set for the encrypted content;
      wherein the encrypted-content-signature file includes:
         a content-hash-list-group including at least one first hash value based on configuration data of the encrypted content, and
         signature data including data generated from a content-encryption-key and from the content-hash-list-group;
   executing, using the data processing circuitry, as part of the encrypted-content-playback-propriety-determination processing,
      hash-value-matching processing between at least one second hash value calculated from the configuration data, and the at least one first hash value included in the content-hash-list-group, and
      signature-verification processing of the signature data in the encrypted-content-signature file;
   permitting, using the data processing circuitry, the decryption and playing-processing only if both of the hash-value-matching processing and the signature-verification processing are successful; and
   executing, using the data processing circuitry, as part of the encrypted content playback propriety determination processing,
      hash-value-replacement processing for replacing the at least one first hash value included in the content-hashlist-group with at least one second hash value calculated from the configuration data, and
signature-verification processing of the signature data in the encrypted content signature file by applying concatenated data of only the content hash list group subjected to the hash value replacement processing, and another hash value of the content-encryption-key.

18. A non-transitory computer readable storage medium encoded with program instructions, which when executed, causes a computer to execute a method of content-providing-processing as to a user device, the method comprising:

generating, using data processing circuitry, configuration data of an encrypted-content-signature file to be applied to content-playback-propriety-determination processing of an encrypted content at the user device;

calculating, using the data processing circuitry, at least one first hash value based on increments of content blocks by data type;

generating, using the data processing circuitry, at least one content-hash-list including the calculated at least one first hash value, based on attribute information including position information of a content block serving as a hash-value-calculation-object;

generating, using the data processing circuitry, a content-hash-list-group collected from a plurality of the at least one content-hash-list;

transmitting, using the data processing circuitry, the generated content-hash-list-group and a content-encryption-key or at least one second hash value of the content-encryption-key to an external signature issuing device;

obtaining, using the data processing circuitry, from the external signature issuing device, an encrypted-content-signature file including the content-hash-list-group, and signature data including data generated based on the content encryption key and from the content-hash-list-group; and providing, using the data processing circuitry, the obtained encrypted-content-signature-file and the encrypted content to the user device, wherein the encrypted content playback propriety determination processing includes:

hash-value-replacement processing for replacing the at least one first hash value included in the content-hash-list-group with at least one second hash value calculated from the configuration data, and signature-verification processing of the signature data in the encrypted content signature file by applying concatenated data of only the content hash list group subjected to the hash value replacement processing, and another hash value of the content-encryption-key.

* * * * *